United States Patent
McAlister

(10) Patent No.: US 8,851,046 B2
(45) Date of Patent: *Oct. 7, 2014

(54) SHAPING A FUEL CHARGE IN A COMBUSTION CHAMBER WITH MULTIPLE DRIVERS AND/OR IONIZATION CONTROL

(75) Inventor: Roy E. McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,919

(22) Filed: Jun. 12, 2012

(65) Prior Publication Data
US 2013/0043323 A1 Feb. 21, 2013

Related U.S. Application Data

(60) Continuation of application No. 13/141,062, filed as application No. PCT/US2010/042817 on Jul. 21, 2010, now Pat. No. 8,267,063, which is a continuation of application No. 12/581,825, filed on Oct. 19, 2009, now Pat. No. 8,297,254, which is a division of application No. 12/006,774, filed on Jan. 7, 2008, now Pat. No. 7,628,137, said application No. PCT/US2010/042817 is a continuation-in-part of application No. 12/006,774, filed on Jan. 7, 2008, now Pat. No. 7,628,137, said application No. PCT/US2010/042817 is a continuation of application No. PCT/US2009/067044, filed on Dec. 7, 2009.

(60) Provisional application No. 61/237,425, filed on Aug. 27, 2009, provisional application No. 61/237,466, filed on Aug. 27, 2009, provisional application No. 61/237,479, filed on Aug. 27, 2009, provisional application No. 61/304,403, filed on Feb. 13, 2010, provisional application No. 61/312,100, filed on Mar. 9, 2010.

(51) Int. Cl.
| | | |
|---|---|---|
| F02M 57/06 | (2006.01) | |
| F02M 33/08 | (2006.01) | |
| F02D 41/30 | (2006.01) | |
| F02D 41/38 | (2006.01) | |
| F02D 35/02 | (2006.01) | |
| F02M 61/18 | (2006.01) | |
| F02M 53/04 | (2006.01) | |
| F02M 31/20 | (2006.01) | |
| F02M 61/12 | (2006.01) | |
| F02M 61/16 | (2006.01) | |
| F02M 69/04 | (2006.01) | |
| F02M 51/06 | (2006.01) | |
| F02M 57/00 | (2006.01) | |
| F02P 23/02 | (2006.01) | |
| F02P 3/02 | (2006.01) | |
| F01N 5/02 | (2006.01) | |

(52) U.S. Cl.
CPC ....... *F02M 57/06* (2013.01); *F02M 2200/9038* (2013.01); *F02M 33/08* (2013.01); *F02M 57/005* (2013.01); *F02D 41/3023* (2013.01); *F02P 23/02* (2013.01); *F02D 41/38* (2013.01); *F02D 35/021* (2013.01); *F02M 61/1893* (2013.01); *Y02T 10/126* (2013.01); *F02M 53/043* (2013.01); *F02M 31/20* (2013.01); *F02M 61/12* (2013.01); *F02M 61/16* (2013.01); *F02P 3/02* (2013.01); *F01N 5/02* (2013.01); *F02M 69/041* (2013.01); *F02M 51/0685* (2013.01)
USPC .......................................... 123/297; 123/490

(58) Field of Classification Search
USPC ......... 123/297, 301, 305, 295, 430, 498, 490, 123/499, 467, 299, 472; 239/102.2, 585.1, 239/585.2, 585.3–585.5
See application file for complete search history.

(56) References Cited

U.S. PATENT DOCUMENTS

| | | |
|---|---|---|
| 1,451,384 A | 4/1923 | Whyte |
| 1,765,237 A | 6/1930 | King |

(Continued)

FOREIGN PATENT DOCUMENTS

| | | |
|---|---|---|
| DE | 3443022 A1 | 5/1986 |
| DE | 10011711 | 10/2001 |

(Continued)

OTHER PUBLICATIONS

International Search Report and Written Opinion for Application No. PCT/US2010/042817; Applicant: McAlister Technologies, LLC.; Date of Mailing: Apr. 29, 2011 (8 pages).

(Continued)

Primary Examiner — Mahmoud Gimie
(74) Attorney, Agent, or Firm — Perkins Coie LLP

(57) ABSTRACT

The present disclosure is directed to injectors with integrated igniters providing efficient injection, ignition, and complete combustion of various types of fuels. These integrated injectors/igniters can include, for example, multiple drivers used to shape charges, controllers used to modify operations based on ionization parameters, and so on.

19 Claims, 10 Drawing Sheets

(56) References Cited

U.S. PATENT DOCUMENTS

| | | | |
|---|---|---|---|
| 2,255,203 A | | 9/1941 | Wiegand |
| 2,441,277 A | | 5/1948 | Lamphere |
| 2,721,100 A | * | 10/1955 | Bodine, Jr. ............... 239/99 |
| 3,058,453 A | | 10/1962 | May |
| 3,060,912 A | | 10/1962 | May |
| 3,081,758 A | | 3/1963 | May |
| 3,243,335 A | | 3/1966 | Faile |
| 3,286,164 A | | 11/1966 | De Huff |
| 3,373,724 A | | 3/1968 | Papst |
| 3,391,680 A | | 7/1968 | Benson |
| 3,520,961 A | | 7/1970 | Suda et al. |
| 3,594,877 A | | 7/1971 | Suda et al. |
| 3,608,050 A | | 9/1971 | Carman et al. |
| 3,689,293 A | | 9/1972 | Beall |
| 3,926,169 A | | 12/1975 | Leshner et al. |
| 3,931,438 A | | 1/1976 | Beall et al. |
| 3,960,995 A | | 6/1976 | Kourkene |
| 3,976,039 A | | 8/1976 | Henault |
| 3,997,352 A | | 12/1976 | Beall |
| 4,020,803 A | | 5/1977 | Thuren et al. |
| 4,066,046 A | | 1/1978 | McAlister |
| 4,095,580 A | | 6/1978 | Murray et al. |
| 4,105,004 A | | 8/1978 | Asai et al. |
| 4,116,389 A | | 9/1978 | Furtah et al. |
| 4,122,816 A | | 10/1978 | Fitzgerald et al. |
| 4,135,481 A | | 1/1979 | Resler, Jr. |
| 4,172,921 A | | 10/1979 | Kiefer |
| 4,183,467 A | | 1/1980 | Sheraton et al. |
| 4,203,393 A | | 5/1980 | Giardini |
| 4,281,797 A | | 8/1981 | Kimata et al. |
| 4,293,188 A | | 10/1981 | McMahon |
| 4,295,453 A | * | 10/1981 | Seilly et al. ............... 123/499 |
| 4,330,732 A | | 5/1982 | Lowther |
| 4,332,223 A | | 6/1982 | Dalton |
| 4,342,443 A | * | 8/1982 | Wakeman ............... 251/129.08 |
| 4,351,299 A | * | 9/1982 | Costello ............... 123/472 |
| 4,364,342 A | | 12/1982 | Asik |
| 4,364,363 A | | 12/1982 | Miyagi et al. |
| 4,368,707 A | | 1/1983 | Leshner et al. |
| 4,377,455 A | | 3/1983 | Kadija et al. |
| 4,381,740 A | | 5/1983 | Crocker |
| 4,382,189 A | | 5/1983 | Wilson |
| 4,391,914 A | | 7/1983 | Beall |
| 4,448,160 A | | 5/1984 | Vosper |
| 4,469,160 A | | 9/1984 | Giamei |
| 4,483,485 A | | 11/1984 | Kamiya et al. |
| 4,511,612 A | | 4/1985 | Huther et al. |
| 4,528,270 A | | 7/1985 | Matsunaga |
| 4,536,452 A | | 8/1985 | Stempin et al. |
| 4,567,857 A | | 2/1986 | Houseman et al. |
| 4,574,037 A | | 3/1986 | Samejima et al. |
| 4,677,960 A | | 7/1987 | Ward |
| 4,684,211 A | | 8/1987 | Weber et al. |
| 4,688,538 A | | 8/1987 | Ward et al. |
| 4,700,891 A | | 10/1987 | Hans et al. |
| 4,716,874 A | | 1/1988 | Hilliard et al. |
| 4,733,646 A | | 3/1988 | Iwasaki |
| 4,736,718 A | | 4/1988 | Linder |
| 4,742,265 A | | 5/1988 | Giachino et al. |
| 4,760,818 A | | 8/1988 | Brooks et al. |
| 4,760,820 A | | 8/1988 | Tozzi |
| 4,774,914 A | | 10/1988 | Ward |
| 4,774,919 A | | 10/1988 | Matsuo et al. |
| 4,777,925 A | | 10/1988 | LaSota |
| 4,834,033 A | | 5/1989 | Larsen |
| 4,841,925 A | | 6/1989 | Ward |
| 4,922,883 A | | 5/1990 | Iwasaki |
| 4,932,263 A | | 6/1990 | Wlodarczyk |
| 4,967,708 A | | 11/1990 | Linder et al. |
| 4,972,996 A | * | 11/1990 | Cerny ............... 239/585.4 |
| 4,977,873 A | | 12/1990 | Cherry et al. |
| 4,982,708 A | | 1/1991 | Stutzenberger |
| 5,034,852 A | | 7/1991 | Rosenberg |
| 5,035,360 A | | 7/1991 | Green et al. |
| 5,055,435 A | | 10/1991 | Hamanaka et al. |
| 5,056,496 A | | 10/1991 | Morino et al. |
| 5,069,189 A | | 12/1991 | Saito |
| 5,072,617 A | | 12/1991 | Weiss |
| 5,076,223 A | | 12/1991 | Harden et al. |
| 5,095,742 A | | 3/1992 | James et al. |
| 5,107,673 A | | 4/1992 | Sato et al. |
| 5,109,817 A | | 5/1992 | Cherry |
| 5,131,376 A | | 7/1992 | Ward et al. |
| 5,150,682 A | | 9/1992 | Magnet |
| 5,193,515 A | | 3/1993 | Oota et al. |
| 5,207,208 A | | 5/1993 | Ward |
| 5,211,142 A | | 5/1993 | Matthews et al. |
| 5,220,901 A | | 6/1993 | Morita et al. |
| 5,222,481 A | | 6/1993 | Morikawa |
| 5,267,601 A | | 12/1993 | Dwivedi |
| 5,297,518 A | | 3/1994 | Cherry |
| 5,305,360 A | | 4/1994 | Remark et al. |
| 5,328,094 A | | 7/1994 | Goetzke et al. |
| 5,329,606 A | | 7/1994 | Andreassen |
| 5,343,699 A | | 9/1994 | McAlister |
| 5,377,633 A | | 1/1995 | Wakeman |
| 5,390,546 A | | 2/1995 | Wlodarczyk |
| 5,392,745 A | | 2/1995 | Beck |
| 5,394,838 A | | 3/1995 | Chandler |
| 5,394,852 A | | 3/1995 | McAlister |
| 5,421,195 A | | 6/1995 | Wlodarczyk |
| 5,421,299 A | | 6/1995 | Cherry |
| 5,435,286 A | | 7/1995 | Carroll, III et al. |
| 5,439,532 A | | 8/1995 | Fraas |
| 5,456,241 A | | 10/1995 | Ward |
| 5,475,772 A | | 12/1995 | Hung et al. |
| 5,497,744 A | | 3/1996 | Nagaosa et al. |
| 5,517,961 A | | 5/1996 | Ward |
| 5,531,199 A | | 7/1996 | Bryant et al. |
| 5,549,746 A | | 8/1996 | Scott et al. |
| 5,568,801 A | | 10/1996 | Paterson et al. |
| 5,584,490 A | | 12/1996 | Inoue et al. |
| 5,588,299 A | | 12/1996 | DeFreitas |
| 5,605,125 A | | 2/1997 | Yaoita |
| 5,607,106 A | | 3/1997 | Bentz et al. |
| 5,608,832 A | | 3/1997 | Pfandl et al. |
| 5,662,389 A | | 9/1997 | Truglio et al. |
| 5,676,026 A | | 10/1997 | Tsuboi et al. |
| 5,694,761 A | | 12/1997 | Griffin, Jr. |
| 5,699,253 A | | 12/1997 | Puskorius et al. |
| 5,702,761 A | | 12/1997 | DiChiara, Jr. et al. |
| 5,704,321 A | | 1/1998 | Suckewer et al. |
| 5,704,553 A | | 1/1998 | Wieczorek et al. |
| 5,714,680 A | | 2/1998 | Taylor et al. |
| 5,715,788 A | | 2/1998 | Tarr et al. |
| 5,738,818 A | | 4/1998 | Atmur et al. |
| 5,745,615 A | | 4/1998 | Atkins et al. |
| 5,746,171 A | | 5/1998 | Yaoita |
| 5,767,026 A | | 6/1998 | Kondoh et al. |
| 5,797,427 A | | 8/1998 | Buescher |
| 5,806,581 A | | 9/1998 | Haasch et al. |
| 5,816,217 A | | 10/1998 | Wong |
| 5,853,175 A | | 12/1998 | Udagawa |
| 5,863,326 A | | 1/1999 | Nause et al. |
| 5,876,659 A | | 3/1999 | Yasutomi et al. |
| 5,915,272 A | | 6/1999 | Foley et al. |
| 5,930,420 A | | 7/1999 | Atkins et al. |
| 5,941,207 A | | 8/1999 | Anderson et al. |
| 5,947,091 A | | 9/1999 | Krohn et al. |
| 5,975,032 A | | 11/1999 | Iwata |
| 5,983,855 A | | 11/1999 | Benedikt et al. |
| 6,000,628 A | | 12/1999 | Lorraine |
| 6,015,065 A | | 1/2000 | McAlister |
| 6,017,390 A | | 1/2000 | Charych et al. |
| 6,026,568 A | | 2/2000 | Atmur et al. |
| 6,029,627 A | | 2/2000 | VanDyne |
| 6,036,120 A | * | 3/2000 | Varble et al. ............... 239/585.1 |
| 6,042,028 A | | 3/2000 | Xu |
| 6,062,498 A | | 5/2000 | Klopfer |
| 6,081,183 A | | 6/2000 | Mading et al. |
| 6,085,990 A | | 7/2000 | Augustin |
| 6,092,501 A | | 7/2000 | Matayoshi et al. |
| 6,092,507 A | | 7/2000 | Bauer et al. |
| 6,093,338 A | | 7/2000 | Tani et al. |

(56) References Cited

U.S. PATENT DOCUMENTS

| | | | |
|---|---|---|---|
| 6,102,303 A | 8/2000 | Bright et al. | |
| 6,131,607 A | 10/2000 | Cooke | |
| 6,138,639 A | 10/2000 | Hiraya et al. | |
| 6,155,212 A | 12/2000 | McAlister | |
| 6,173,913 B1 | 1/2001 | Shafer et al. | |
| 6,185,355 B1 | 2/2001 | Hung | |
| 6,189,522 B1 | 2/2001 | Moriya | |
| 6,209,805 B1 * | 4/2001 | Male et al. | 239/585.1 |
| 6,253,728 B1 | 7/2001 | Matayoshi et al. | |
| 6,267,307 B1 | 7/2001 | Pontoppidan | |
| 6,281,976 B1 | 8/2001 | Taylor et al. | |
| 6,302,080 B1 | 10/2001 | Kato et al. | |
| 6,318,306 B1 | 11/2001 | Komatsu | |
| 6,335,065 B1 | 1/2002 | Steinlage et al. | |
| 6,338,445 B1 | 1/2002 | Lambert et al. | |
| 6,340,015 B1 | 1/2002 | Benedikt et al. | |
| 6,360,721 B1 | 3/2002 | Schuricht et al. | |
| 6,378,485 B2 | 4/2002 | Elliott | |
| 6,386,178 B1 | 5/2002 | Rauch | |
| 6,405,940 B2 * | 6/2002 | Harcombe et al. | 239/88 |
| 6,422,836 B1 * | 7/2002 | Krueger et al. | 417/418 |
| 6,446,597 B1 | 9/2002 | McAlister | |
| 6,453,660 B1 | 9/2002 | Johnson et al. | |
| 6,455,173 B1 | 9/2002 | Marijnissen et al. | |
| 6,455,451 B1 | 9/2002 | Brodkin et al. | |
| 6,478,007 B2 | 11/2002 | Miyashita et al. | |
| 6,490,391 B1 | 12/2002 | Zhao et al. | |
| 6,501,875 B2 | 12/2002 | Zhao et al. | |
| 6,502,555 B1 * | 1/2003 | Harcombe et al. | 123/467 |
| 6,503,584 B1 | 1/2003 | McAlister | |
| 6,506,336 B1 | 1/2003 | Beall et al. | |
| 6,516,114 B2 | 2/2003 | Zhao et al. | |
| 6,517,011 B1 | 2/2003 | Ayanji et al. | |
| 6,517,623 B1 | 2/2003 | Brodkin et al. | |
| 6,532,315 B1 | 3/2003 | Hung et al. | |
| 6,536,405 B1 | 3/2003 | Rieger et al. | |
| 6,542,663 B1 | 4/2003 | Zhao et al. | |
| 6,543,700 B2 | 4/2003 | Jameson et al. | |
| 6,549,713 B1 | 4/2003 | Pi et al. | |
| 6,550,458 B2 | 4/2003 | Yamakado et al. | |
| 6,556,746 B1 | 4/2003 | Zhao et al. | |
| 6,561,168 B2 | 5/2003 | Hokao et al. | |
| 6,567,599 B2 | 5/2003 | Hung | |
| 6,571,035 B1 | 5/2003 | Pi et al. | |
| 6,578,775 B2 | 6/2003 | Hokao | |
| 6,583,901 B1 | 6/2003 | Hung | |
| 6,584,244 B2 | 6/2003 | Hung | |
| 6,585,171 B1 | 7/2003 | Boecking | |
| 6,587,239 B1 | 7/2003 | Hung | |
| 6,599,028 B1 | 7/2003 | Shu et al. | |
| 6,615,810 B2 | 9/2003 | Funk et al. | |
| 6,615,899 B1 | 9/2003 | Woodward et al. | |
| 6,619,269 B1 | 9/2003 | Stier et al. | |
| 6,621,964 B2 | 9/2003 | Quinn et al. | |
| 6,626,164 B2 | 9/2003 | Hitomi et al. | |
| 6,647,948 B2 | 11/2003 | Kyuuma et al. | |
| 6,663,027 B2 | 12/2003 | Jameson et al. | |
| 6,668,630 B1 | 12/2003 | Kuglin et al. | |
| 6,672,277 B2 | 1/2004 | Yasuoka et al. | |
| 6,700,306 B2 | 3/2004 | Nakamura et al. | |
| 6,705,274 B2 | 3/2004 | Kubo | |
| 6,719,224 B2 | 4/2004 | Enomoto et al. | |
| 6,722,339 B2 | 4/2004 | Elliott | |
| 6,722,340 B1 | 4/2004 | Sukegawa et al. | |
| 6,722,840 B2 | 4/2004 | Fujisawa et al. | |
| 6,725,826 B2 | 4/2004 | Esteghlal | |
| 6,745,744 B2 | 6/2004 | Suckewer et al. | |
| 6,748,918 B2 | 6/2004 | Rieger et al. | |
| 6,749,043 B2 | 6/2004 | Brown et al. | |
| 6,755,175 B1 * | 6/2004 | McKay et al. | 123/297 |
| 6,756,140 B1 | 6/2004 | McAlister | |
| 6,763,811 B1 | 7/2004 | Tamol, Sr. | |
| 6,766,965 B2 | 7/2004 | D'Arrigo | |
| 6,776,352 B2 | 8/2004 | Jameson | |
| 6,779,513 B2 | 8/2004 | Pellizzari et al. | |
| 6,796,516 B2 | 9/2004 | Maier et al. | |
| 6,802,894 B2 | 10/2004 | Brodkin et al. | |
| 6,811,103 B2 | 11/2004 | Gurich et al. | |
| 6,814,313 B2 | 11/2004 | Petrone et al. | |
| 6,832,472 B2 | 12/2004 | Huang et al. | |
| 6,832,588 B2 | 12/2004 | Herden et al. | |
| 6,845,920 B2 | 1/2005 | Sato et al. | |
| 6,851,413 B1 | 2/2005 | Tamol, Sr. | |
| 6,854,438 B2 | 2/2005 | Hilger et al. | |
| 6,871,630 B2 | 3/2005 | Herden et al. | |
| 6,883,490 B2 | 4/2005 | Jayne | |
| 6,892,971 B2 | 5/2005 | Rieger et al. | |
| 6,898,355 B2 | 5/2005 | Johnson et al. | |
| 6,899,076 B2 | 5/2005 | Funaki et al. | |
| 6,904,893 B2 | 6/2005 | Hotta et al. | |
| 6,912,998 B1 | 7/2005 | Rauznitz et al. | |
| 6,925,983 B2 | 8/2005 | Herden et al. | |
| 6,940,213 B1 | 9/2005 | Heinz et al. | |
| 6,954,074 B2 | 10/2005 | Zhu et al. | |
| 6,955,154 B1 | 10/2005 | Douglas | |
| 6,959,693 B2 | 11/2005 | Oda | |
| 6,964,263 B2 * | 11/2005 | Xi et al. | 123/499 |
| 6,976,683 B2 | 12/2005 | Eckert et al. | |
| 6,978,767 B2 | 12/2005 | Bonutti | |
| 6,984,305 B2 | 1/2006 | McAlister | |
| 6,993,960 B2 | 2/2006 | Benson | |
| 6,994,073 B2 | 2/2006 | Tozzi et al. | |
| 7,007,658 B1 | 3/2006 | Cherry et al. | |
| 7,007,661 B2 | 3/2006 | Warlick | |
| 7,013,863 B2 | 3/2006 | Shiraishi et al. | |
| 7,025,358 B2 | 4/2006 | Ueta et al. | |
| 7,032,845 B2 | 4/2006 | Dantes et al. | |
| 7,070,126 B2 | 7/2006 | Shinogle | |
| 7,073,480 B2 | 7/2006 | Shiraishi et al. | |
| 7,077,100 B2 | 7/2006 | Vogel et al. | |
| 7,077,108 B2 | 7/2006 | Fujita et al. | |
| 7,077,379 B1 | 7/2006 | Taylor | |
| 7,086,376 B2 | 8/2006 | McKay | |
| 7,104,246 B1 | 9/2006 | Gagliano et al. | |
| 7,104,250 B1 | 9/2006 | Yi et al. | |
| 7,121,253 B2 | 10/2006 | Shiraishi et al. | |
| 7,131,426 B2 | 11/2006 | Ichinose et al. | |
| 7,137,382 B2 | 11/2006 | Zhu et al. | |
| 7,138,046 B2 | 11/2006 | Roychowdhury | |
| 7,140,347 B2 | 11/2006 | Suzuki et al. | |
| 7,140,353 B1 | 11/2006 | Rauznitz et al. | |
| 7,140,562 B2 | 11/2006 | Holzgrefe et al. | |
| 7,198,208 B2 | 4/2007 | Dye et al. | |
| 7,201,136 B2 | 4/2007 | McKay et al. | |
| 7,204,133 B2 | 4/2007 | Benson et al. | |
| 7,214,883 B2 | 5/2007 | Leyendecker | |
| 7,228,840 B2 | 6/2007 | Sukegawa et al. | |
| 7,249,578 B2 | 7/2007 | Fricke et al. | |
| 7,255,290 B2 | 8/2007 | Bright et al. | |
| 7,272,487 B2 | 9/2007 | Christen et al. | |
| 7,278,392 B2 | 10/2007 | Zillmer et al. | |
| 7,305,971 B2 | 12/2007 | Fujii | |
| 7,309,029 B2 | 12/2007 | Boecking | |
| 7,340,118 B2 | 3/2008 | Wlodarczyk et al. | |
| 7,367,319 B2 | 5/2008 | Kuo et al. | |
| 7,386,982 B2 | 6/2008 | Runkle et al. | |
| 7,395,146 B2 | 7/2008 | Ueda et al. | |
| 7,404,395 B2 | 7/2008 | Yoshimoto | |
| 7,409,929 B2 | 8/2008 | Miyahara et al. | |
| 7,418,940 B1 | 9/2008 | Yi et al. | |
| 7,481,043 B2 | 1/2009 | Hirata et al. | |
| 7,484,369 B2 | 2/2009 | Myhre | |
| 7,513,222 B2 | 4/2009 | Orlosky | |
| 7,527,041 B2 | 5/2009 | Wing et al. | |
| 7,540,271 B2 | 6/2009 | Stewart et al. | |
| 7,554,250 B2 | 6/2009 | Kadotani et al. | |
| 7,588,012 B2 | 9/2009 | Gibson et al. | |
| 7,625,531 B1 | 12/2009 | Coates et al. | |
| 7,626,315 B2 | 12/2009 | Nagase | |
| 7,628,137 B1 | 12/2009 | McAlister | |
| 7,650,873 B2 | 1/2010 | Hofbauer et al. | |
| 7,703,775 B2 | 4/2010 | Matsushita et al. | |
| 7,707,832 B2 | 5/2010 | Commaret et al. | |
| 7,714,483 B2 | 5/2010 | Hess et al. | |

(56) References Cited

U.S. PATENT DOCUMENTS

| | | | |
|---|---|---|---|
| 7,728,489 | B2 | 6/2010 | Heinz et al. |
| 7,849,833 | B2 | 12/2010 | Toyoda |
| 7,880,193 | B2 | 2/2011 | Lam |
| 7,886,993 | B2 | 2/2011 | Bachmaier et al. |
| 7,898,258 | B2 | 3/2011 | Neuberth et al. |
| 7,918,212 | B2 | 4/2011 | Verdejo et al. |
| 7,938,102 | B2 | 5/2011 | Sherry |
| 7,942,136 | B2 | 5/2011 | Lepsch et al. |
| 7,963,458 | B2 | 6/2011 | McNichols et al. |
| 8,039,412 | B2 | 10/2011 | Park et al. |
| 8,069,836 | B2 | 12/2011 | Ehresman |
| 8,074,625 | B2 | 12/2011 | McAlister |
| 8,091,528 | B2 | 1/2012 | McAlister |
| 2002/0017573 | A1 | 2/2002 | Sturman |
| 2002/0084793 | A1 | 7/2002 | Hung et al. |
| 2002/0131171 | A1 | 9/2002 | Hung |
| 2002/0131666 | A1 | 9/2002 | Hung et al. |
| 2002/0131673 | A1 | 9/2002 | Hung |
| 2002/0131674 | A1 | 9/2002 | Hung |
| 2002/0131706 | A1 | 9/2002 | Hung |
| 2002/0131756 | A1 | 9/2002 | Hung |
| 2002/0141692 | A1 | 10/2002 | Hung |
| 2002/0150375 | A1 | 10/2002 | Hung et al. |
| 2002/0151113 | A1 | 10/2002 | Hung et al. |
| 2003/0012985 | A1 | 1/2003 | McAlister |
| 2003/0042325 | A1 | 3/2003 | D'Arrigo |
| 2003/0111042 | A1* | 6/2003 | Rieger et al. ............ 123/297 |
| 2003/0127531 | A1 | 7/2003 | Hohl |
| 2004/0008989 | A1 | 1/2004 | Hung |
| 2005/0098663 | A1 | 5/2005 | Ishii |
| 2005/0255011 | A1 | 11/2005 | Greathouse et al. |
| 2006/0005738 | A1 | 1/2006 | Kumar |
| 2006/0005739 | A1 | 1/2006 | Kumar |
| 2006/0016916 | A1 | 1/2006 | Petrone et al. |
| 2006/0037563 | A1 | 2/2006 | Raab et al. |
| 2006/0108452 | A1 | 5/2006 | Anzinger et al. |
| 2006/0169244 | A1 | 8/2006 | Allen |
| 2007/0189114 | A1 | 8/2007 | Reiner et al. |
| 2007/0283927 | A1 | 12/2007 | Fukumoto et al. |
| 2008/0072871 | A1 | 3/2008 | Vogel et al. |
| 2008/0081120 | A1 | 4/2008 | Van Ooij et al. |
| 2008/0098984 | A1 | 5/2008 | Sakamaki |
| 2009/0078798 | A1 | 3/2009 | Gruendl et al. |
| 2009/0093951 | A1 | 4/2009 | McKay et al. |
| 2009/0204306 | A1 | 8/2009 | Goeke et al. |
| 2009/0264574 | A1 | 10/2009 | Van Ooij et al. |
| 2010/0020518 | A1 | 1/2010 | Bustamante |
| 2010/0077986 | A1 | 4/2010 | Chen |
| 2010/0108023 | A1 | 5/2010 | McAlister |
| 2010/0183993 | A1 | 7/2010 | McAlister |
| 2011/0036309 | A1 | 2/2011 | McAlister |
| 2011/0042476 | A1 | 2/2011 | McAlister |
| 2011/0048371 | A1 | 3/2011 | McAlister |
| 2011/0048374 | A1 | 3/2011 | McAlister |
| 2011/0056458 | A1 | 3/2011 | McAlister |
| 2011/0057058 | A1 | 3/2011 | McAlister |
| 2011/0146619 | A1 | 6/2011 | McAlister |
| 2011/0210182 | A1 | 9/2011 | McAlister |
| 2011/0233308 | A1 | 9/2011 | McAlister |
| 2011/0253104 | A1 | 10/2011 | McAlister |
| 2011/0297753 | A1 | 12/2011 | McAlister et al. |

FOREIGN PATENT DOCUMENTS

| | | |
|---|---|---|
| DE | 10313859 | 12/2003 |
| DE | 102005060139 A1 | 6/2007 |
| EP | 392594 A2 | 10/1990 |
| EP | 671555 A1 | 9/1995 |
| EP | 1972606 A1 | 9/2008 |
| FR | 2922964 | 5/2009 |
| GB | 1038490 A | 8/1966 |
| JP | 61-023862 A | 2/1986 |
| JP | 6270656 | 4/1987 |
| JP | 2061360 | 1/1990 |
| JP | 02-259268 A | 10/1990 |
| JP | 08-049623 A | 2/1996 |
| JP | 08-334077 A | 12/1996 |
| JP | 2004-324613 A | 11/2004 |
| JP | 2007231929 | 9/2007 |
| KR | 2007-0026296 A | 3/2007 |
| KR | 2008-0073635 A | 8/2008 |
| WO | WO-2007031157 A1 | 3/2007 |
| WO | WO-2008-017576 A1 | 2/2008 |

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." NASA Technical Memorandum (NASA TM-73833). Lewis Research Center. Nov. 1977. pp. 1-15.

Britt, Robert Roy. "Powerful Solar Storm Could Shut Down U.S. For Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

Hollembeak, Barry. "Automotive Fuels & Emissions." Thomson Delmar Learning. Clifton Park, NY. 2005. p. 298.

InfraTec GmbH. "Evaluation Kit for FPI Detectors | Datasheet—Detector Accessory." 2009. pp. 1-2.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 1-10.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

International Search Report and Written Opinion for Application No. PCT/US2010/059146; Applicant: McAlister Technologies, LLC.; Date of Mailing: Aug. 31, 2011, 11 pages.

* cited by examiner

SHAPING A FUEL CHARGE IN A COMBUSTION CHAMBER WITH MULTIPLE DRIVERS AND/OR IONIZATION CONTROL

CROSS REFERENCE TO RELATED APPLICATIONS

The present application is a continuation of U.S. application Ser. No. 13/141,062, filed Jun. 20, 2011 and titled SHAPING A FUEL CHARGE IN A COMBUSTION CHAMBER WITH MULTIPLE DRIVERS AND/OR IONIZATION CONTROL, which is a U.S. National Stage of International Patent Application No. PCT/US10/42817, filed Jul. 21, 2010 and titled SHAPING A FUEL CHARGE IN A COMBUSTION CHAMBER WITH MULTIPLE DRIVERS AND/OR IONIZATION CONTROL, which claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237,479, filed Aug. 27, 2009 and titled FULL SPECTRUM ENERGY; U.S. Patent application Ser. No. 12/581,825, filed Oct. 19, 2009 and titled MULTIFUEL STORAGE, METERING AND IGNITION SYSTEM. U.S. patent application Ser. No. 12/581,825 is a divisional of U.S. patent application Ser. No. 12/006,774, filed Oct. 19, 2009 and titled MULTIFUEL STORAGE, METERING AND IGNITION SYSTEM. International Patent Application No. PCT/US10/42817 claims priority to and the benefit of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE. U.S. patent application Ser. No. 12/653,085 is a continuation-in-part of U.S. patent application Ser. No. 12/006,774, filed Oct. 19, 2009 and titled MULTIFUEL STORAGE, METERING AND IGNITION SYSTEM and claims priority to and the benefit of U.S. patent application Ser. No. 61/237,466 filed Aug. 27, 2009 and titled MULTIFUEL MULTIBURST. International Patent Application No. PCT/US10/42817 claims priority to and the benefit of PCT Application No. PCT/US09/67044, filed Dec. 7, 2009 and titled INTEGRATED FUEL INJECTORS AND IGNITERS AND ASSOCIATED METHODS OF USE AND MANUFACTURE. International Patent Application No. PCT/US09/67044 claims priority to and the benefit of U.S. patent application Ser. No. 61/237,466 filed Aug. 27, 2009 and titled MULTIFUEL MULTIBURST. Interational Patent Application No. PCT/US10/42817 claims priority to and the benefit of U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. Each of these applications is incorporated herein by reference in its entirety.

TECHNICAL FIELD

The following disclosure relates generally to fuel injectors and igniters and associated components for injecting and igniting various fuels in an internal combustion engine.

BACKGROUND

Engines designed for petroleum based fuel operations are notoriously inefficient. Illustratively, during operation, gasoline is mixed with air to form a homogeneous mixture that enters a combustion chamber of an engine during throttled conditions of an intake cycle. The mixture of gasoline (fuel) and air is then compressed to near top dead center (TDC) conditions and ignited by a spark, such as a spark generated by a spark plug or a fuel igniter.

Often, modern engines are designed to minimize curb weight of the engine and to utilize lean fuel-air rations in efforts to limit peak combustion temperatures within the engine. Efforts to limit the peak combustion temperature may also include water injection and various additives to reduce the rate of homogeneous charge combustion. These engines generally contain small cylinders and high piston speeds. Although air throttling limits the amount of air and thus the fuel that can be admitted to achieve a spark-ignitable mixture at all power levels of operation, these engines are also designed to minimize flow impedance of homogeneously mixed fuel and air that enters the combustion chamber, with combustion chamber heads often containing two or three intake valves and two or three exhaust valves. Also, many engines include valves operated by overhead camshafts and other valve operations. These engine components use much of the space available over the pistons in an engine, and limit the area in an engine head in which to insert a direct cylinder fuel injector (for a diesel or compressed-ignition engine) or a spark plug (for a gasoline engine).

In addition to multiple valves restricting the available space for fuel injectors and spark plugs, the multiple valves often supply large heat loads to an engine head due to a greater heat gain during heat transfer from the combustion chamber to the engine head and related components. There may be further heat generated in the engine head by cam friction, valve springs, valve lifters, and other components, particularly in high-speed operations of the valves.

Spark ignition of an engine is a high voltage but low energy ionization of a mixture of air and fuel (such as 0.05 to 0.15 joules for normally aspirated engines equipped with spark plugs that operate with compression ratios of 12:1 or less). In order to maintain a suitable ionization, when the ambient pressure in a spark gap increases, the required voltage should also increase. For example, smaller ratios of fuel to air to provide a lean mixture, a wider spark gap to achieve sustained ignition, supercharging or turbocharging or other conditions may change the ionization potential or ambient pressure in a spark gap, and hence require an increase in the applied voltage.

Applying a high voltage applied to a conventional spark plug or fuel igniter, generally located near the wall of the combustion chamber, often causes heat loss due to combusting the air-fuel mixtures at and near surfaces within the combustion chamber, including the piston, cylinder wall, cylinder head, and valves. Such heat loss reduces the efficiency of the engine and can degrade combustion chamber components susceptible to oxidation, corrosion, thermal fatigue, increased friction due to thermal expansion, distortion, warpage, and wear due to evaporation or loss of viability of overheated or oxidized lubricating films. It follows that the greater the amount of heat lost to combustion chamber surfaces, the greater the degree of failure to complete a combustion process.

Efforts to control air-fuel ratios, providing more advantageous burn conditions for higher fuel efficiency, lower peak combustion temperatures, and reduced production of oxides, often cause numerous problems. Lower or leaner air-fuel ratios burn slower than stoichiometric or fuel-rich mixtures.

Slower combustion requires greater time to complete the two- or four-stroke operation of an engine, thus reducing the power potential of the engine design.

These and other problems exist with respect to internal combustion engines.

DETAILED DESCRIPTION

Figure 1:
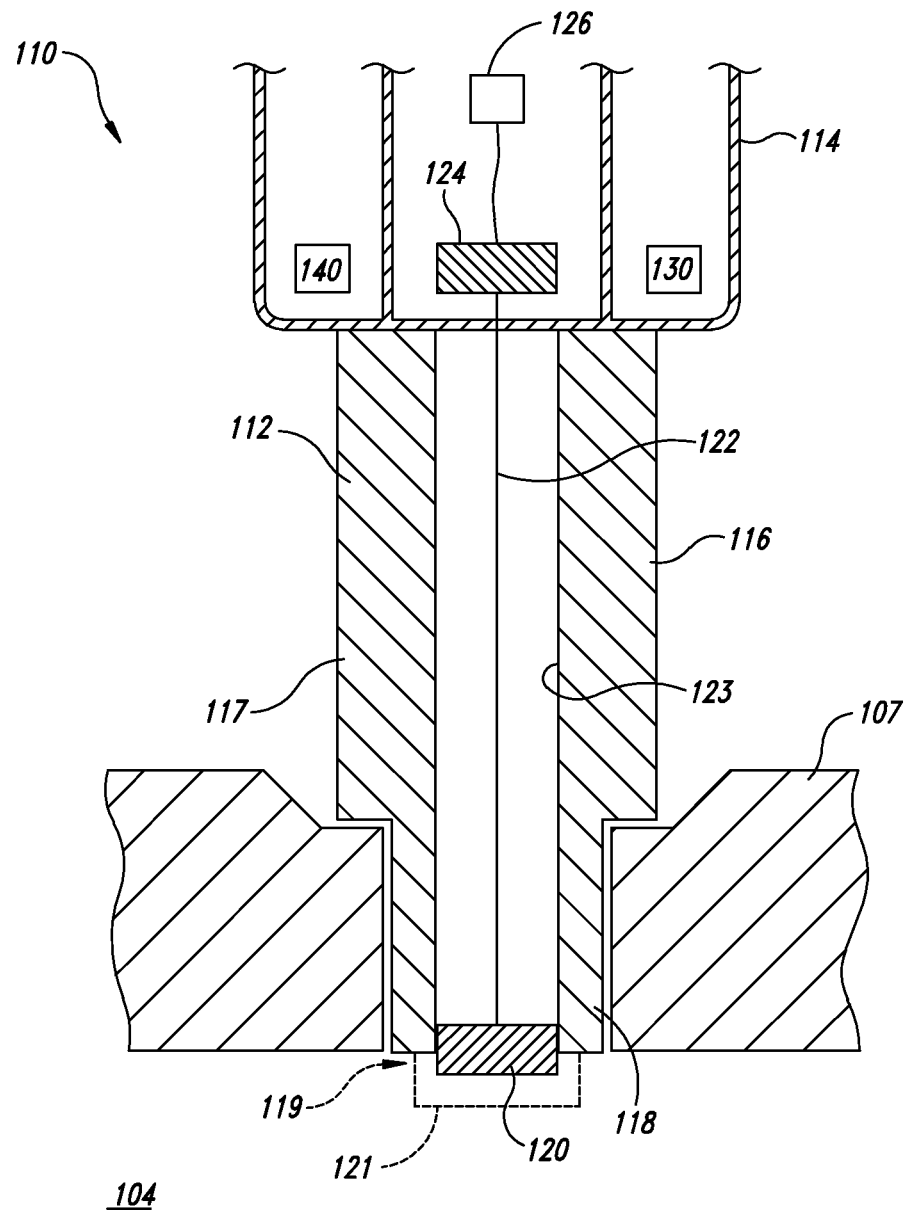
FIG. 1 is a schematic view of a suitable injector/igniter.

The present application incorporates herein by reference in its entirety the subject matter of U.S. patent application Ser. No. 12/006,774 (now U.S. Pat. No. 7,628,137), filed Jan. 7, 2008 and titled MULTIFUEL STORAGE, METERING, AND IGNITION SYSTEM. The present application incorporates by reference in their entirety the subject matter of each of the following U.S. Patent Applications, filed concurrently herewith on Jul. 21, 2010: U.S. patent application Ser. No. 12/841,170 (now U.S. Pat. No. 8,555,860) titled INTEGRATED FUEL INJECTORS AND IGNITERS AND ASSOCIATED METHODS OF USE AND MANUFACTURE; U.S. patent application Ser. No. 12/804,510 (now U.S. Pat. No. 8,074,625) titled FUEL INJECTOR ACTUATOR ASSEMBLIES AND ASSOCIATED METHODS OF USE AND MANUFACTURE; U.S. patent application Ser. No. 12/841,146 (now U.S. Pat. No. 8,413,634) titled INTEGRATED FUEL INJECTORS AND IGNITERS WITH CONDUCTIVE CABLE ASSEMBLIES; U.S. patent application Ser. No. 12/841,135 (now U.S. Pat. No. 8,192,852) titled CERAMIC INSULATOR AND METHODS OF USE AND MANUFACTURE THEREOF; U.S. patent application Ser. No. 8,561,598 (now U.S. Pat. No. 8,561,598) titled METHOD AND SYSTEM OF THERMOCHEMICAL REGENERATION TO PROVIDE OXYGENATED FUEL, FOR EXAMPLE, WITH FUEL-COOLED FUEL INJECTORS; and U.S. patent application Ser. No. 12/804,508 now U.S. Pat. No. 8,387,599) titled METHODS AND SYSTEMS FOR REDUCING THE FORMATION OF OXIDES OF NITROGEN DURING COMBUSTION IN ENGINES.

Overview

The present disclosure describes devices, systems, and methods for providing a fuel injector configured to be used with a variety of different fuels. In some embodiments, the fuel injector includes ignition components, such as electrodes, and act as a combination injector-igniter. In some embodiments, the fuel injector includes two or more drivers or force generators configured to impart two or more driving forces to a fuel-dispensing device (e.g., a valve) in order to modify the shape or other characteristics of the fuel when injecting the fuel into a combustion chamber of an engine. For example, the fuel injector may include an electromagnetic driver that causes a valve to open and a piezoelectric driver that causes the open valve to modulate in the opening. Such modulation may provide certain shapes and/or surface area to volume ratios of the fuel entering surplus oxidant, such as fuel aerosols, dispersions, or fogs of varying fuel densities, among other things.

In some embodiments, fuel injection and/or ignition devices are integrated with internal combustion engines, as well as associated systems, assemblies, components, and methods. For example, some embodiments described herein are directed to adaptable fuel injectors/igniters that optimize or improve the injection and/or combustion of various fuels based on combustion chamber conditions, among other benefits.

In some embodiments, controllers associated with fuel injectors and/or ignition systems measure certain characteristics of a combustion chamber and modify operations of the fuel injectors and/or ignition systems accordingly. For example, the controllers may measure the ionization of an air-fuel mixture within a combustion chamber and modify the operation of the fuel injector and/or the fuel igniter based on the measurements. In some cases, the controllers modify the shape or characteristics of injected fuel. In some cases, the controllers modify the operation of the fuel igniters, such as by reversing a polarity of a voltage applied to electrodes of the fuel igniter, among other things. Such modification of the injected fuel and/or the operation of various devices may provide improved or faster ignition of air-fuel mixtures or may reduce or prevent erosion of the electrodes and other internal components, among other benefits.

Certain details are set forth in the following description and in FIGS. 1-8 to provide a thorough understanding of various embodiments of the disclosure. However, other details describing well-known structures and systems often associated with internal combustion engines, injectors, igniters, controllers, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described herein, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this Specification are not necessarily all referring to the same embodiment. Furthermore, the particular features, structures, or characteristics may be combined in any suitable manner in one or more embodiments. In addition, the headings provided herein are for convenience only and do not interpret the scope or meaning of the claimed disclosure.

Suitable Systems and Devices

As discussed herein, various different fuel injectors and/or fuel igniters may perform some or all of the processes described herein, including modifying the shape of injected fuel, modifying the shape of the mixture of fuel and oxidant, modifying the operation of systems and devices, and so on. FIG. 1 is a schematic view of a suitable integrated injector/igniter 110 configured in accordance with various embodiments of this disclosure. The injector 110 may inject various different fuels into a combustion chamber 104, such as a combustion chamber within a combustion engine. Further, the injector 104 may adaptively adjust the pattern and/or frequency of the fuel injections or bursts based on combustion properties, parameters, and/or conditions within the combustion chamber 104. Thus, the injector 110 may optimize or improve characteristics (e.g., shape of fuel) of injected fuel to achieve benefits such as rapid ignition, to reduce the time for completion of combustion, or to reduce the total distance of fuel travel to achieve complete combustion, or to reduce heat losses from combustion events. In addition to injecting fuel, the injector 110 may also ignite the injected fuel using one or more integrated ignition devices and components that are configured to ignite the injected fuel. As such, the injector 110 can be utilized to convert conventional internal combustion engines for use with many different fuels.

The injector 110 includes a body 112 having a middle portion 116 extending between a base portion 114 and a nozzle portion 118. The nozzle portion 118 extends at least partially through a port in an engine head 107 to position an end portion 119 of the nozzle portion 118 at an interface with the combustion chamber 104. The injector 110 includes a passage or channel 123 extending through the body 112 from the base portion 114 to the nozzle portion 118. The channel 123 is configured to allow fuel to flow through the body 112. The channel 123 is also configured to allow other components, such as an actuator 122, to pass through the body 112, as well as instrumentation components and/or energy source components of the injector 110. In some cases, the actuator 122 is a cable or rod that has a first end portion that is operatively coupled to a flow control device or valve 120 carried by the end portion 119 of the nozzle portion 118. As such, the flow valve 120 is positioned proximate to the interface with the combustion chamber 104. In some cases, the injector 110 can include more than one flow valve as shown in U.S. patent application entitled Fuel Injector Actuator Assemblies and Associated Methods of Use and Manufacture, filed concurrently on Jul. 21, 2010, as well as one or more check valves positioned proximate to the combustion chamber 104, as well as at other locations on the body 112.

The actuator 122 includes a second end portion operatively coupled to a one or more drivers 124, 130, 140. The second end portion can further be coupled to a controller or processor 126. The controller 126 and/or the drivers 124, 130, 140 are configured to cause the valve 120 to inject fuel into the combustion chamber 104 via the actuator 122. In some cases, the actuator 122, driven by one or more of the drivers, causes the flow valve 120 move outwardly (e.g., toward the combustion chamber 104) to meter and control injection of the fuel. In some cases, the actuator 122, driven by one or more of the drivers, causes the flow valve 120 to move inwardly (e.g., away from the combustion chamber 104) to meter and control injection of the fuel.

The drivers 124, 130, 140 are responsive to instructions received from the controller 126 as well as other components providing instruction. Various different drivers may impart forces to the actuator 122, such as acoustic drivers, electromagnetic drivers, piezoelectric drivers, and so on, to achieve a desired frequency, pattern, and/or shape of injected fuel bursts.

As discussed herein, in some embodiments, the fuel injector includes two or more drivers used to impart driving forces on the actuator 122. For example, a first driver 124 may tension the actuator 122 to retain the flow valve 120 in a closed or seated position, or may relax the actuator 122 to allow the flow valve 120 to inject fuel, and vice versa. A second driver 130 or 140 may close, vibrate, pulsate, or modulate the actuator 122 in the open position. Thus, the fuel injector 110 may employ two or more driving forces on the valve 120 to achieve a desired frequency, pattern, and/or shape of injected fuel bursts.

In some embodiments, the fuel injector 110 includes one or more integrated sensing and/or transmitting components to detect combustion chamber properties and conditions. The actuator 122 may be formed from fiber optic cables, from insulated transducers integrated within a rod or cable, or can include other sensors to detect and communicate combustion chamber data. The fuel injector 110 may include other sensors or monitoring instrumentation (not shown) located at various positions on or in the fuel injector 110. The body 112 may include optical fibers integrated into the material of the body 112, or the material of the body 112 may be used to communicate combustion data to one or more controllers, such as controller 126.

In addition, the flow valve 120 may be configured to measure data or carry sensors in order to transmit combustion data to one or more controllers associated with the fuel injector 110. The data may be transmitted via wireless, wired, optical or other transmission devices and protocols. Such feedback enables extremely rapid and adaptive adjustments for optimization of fuel injection factors and characteristics including, for example, fuel delivery pressure, fuel injection initiation timing, fuel injection durations for production of multiple layered or stratified charges, the timing of one, multiple or continuous plasma ignitions or capacitive discharges, preventing erosion of components, and so on.

The controller 126 may include components capable and configured to receive the data measured by the sensors, store the data received from the sensors, store other data associated with fuel injection or operations of a fuel injector or fuel igniter, processors, communication components, and so on. Thus, the controller may include various microprocessors, memory components, communication components, and other components used to adjust and/or modify various operations. These components, modules, or systems described herein, such as components of the controller 126 and/or the drivers 126, 130, 140 may comprise software, firmware, hardware, or any combination(s) of software, firmware, or hardware suitable for the purposes described herein, including wireless communication from remote areas of operation to a central command and control location. The software may be executed by a general-purpose computer, such as a computer associated with an ignition system or vehicle utilizing an ignition system. Those skilled in the relevant art will appreciate that aspects of the system can be practiced with other communications, data processing, or computer system configurations. Furthermore, aspects of the system can be embodied in a special purpose computer or data processor that is specifically programmed, configured, or constructed to perform one or more of the computer-executable instructions explained in detail herein. Data structures described herein may comprise computer files, variables, programming arrays, programming structures, or any electronic information storage schemes or methods, or any combinations thereof, suitable for the purposes described herein. Data and other information, such as data structures, routines, algorithms, and so on, may be stored or distributed on computer-readable media, including magnetically or optically readable computer discs, hard-wired or preprogrammed chips (e.g., EEPROM semiconductor chips), nanotechnology memory, biological memory, or other data storage media.

In some embodiments, the fuel injector 110 includes an ignition and flow adjusting device or cover 121 carried by the end portion 119, adjacent to the engine head 107. The cover 121 at least partially encloses or surrounds the flow valve 120. The cover 121 may also be configured to protect certain components of the injector 110, such as sensors or other monitoring components. The cover 121 may also act as a catalyst, catalyst carrier and/or first electrode for ignition of the injected fuels. Moreover, the cover 121 may be configured to affect the shape, pattern, and/or phase of the injected fuel.

In some embodiments, the flow valve 120 is configured to affect these properties of the injected fuel, and may include one or more electrodes used for ignition of the injected fuels. For example, the cover 121 and/or the flow valve 120 can be configured to create sudden gasification of the fuel flowing past these components. The cover 121 and/or the flow valve 120 can include surfaces having sharp edges, catalysts, or other features that produce gas or vapor from the rapidly entering liquid fuel or mixture of liquid and solid fuel. The acceleration and/or frequency of the flow valve 120 actuation can also suddenly gasify the injected fuel. In operation, sudden gasification causes the vapor or gas emitted from the nozzle portion 118 to rapidly and completely combust. The sudden gasification may be used in various combinations with super heating liquid fuels and plasmas or acoustical impetus of projected fuel bursts. In some cases, the movement of the flow valve 12, such as modulated movement due to multiple driving forces, induces the plasma projection to beneficially affect the shape and/or pattern of the injected fuel.

In some embodiments, at least a portion of the body 112 is made from one or more dielectric materials 117 suitable to enable high energy ignition of injected fuels to combust different fuels, including unrefined fuels or low energy density fuels. These dielectric materials 117 may provide sufficient electrical insulation from high voltages used in the production, isolation, and/or delivery of spark or plasma for ignition. In some cases, the body 112 is made from a single dielectric material 117. In some cases, the body 112 is made from two or more dielectric materials. For example, the middle portion 116 may be made from a first dielectric material having a first dielectric strength, and the nozzle portion 118 may be made from a dielectric material having a second dielectric strength that is greater than the first dielectric strength. With a relatively strong second dielectric strength, the second dielectric material may protect the fuel injector 110 from thermal and mechanical shock, fouling, voltage tracking, and so on.

In some embodiments, the fuel injector 110 is coupled to a power or high voltage source to generate an ignition event and combust injected fuels. A first electrode can be coupled to the power source (e.g., a voltage generation source such as a capacitance discharge, induction, or piezoelectric system) via one or more conductors extending through the fuel injector 110. Regions of the nozzle portion 118, the flow valve 120, and/or the cover 121 may operate as a first electrode to generate an ignition event with a corresponding second electrode at or integrated into the engine head 107. Example ignition events include generating sparks, plasmas, compression ignition operations, high energy capacitance discharges, extended induction sourced sparks, and/or direct current or high frequency plasmas, often in conjunction with the application of ultrasound to quickly induce, impel, and finish combustion.

Figure 2:
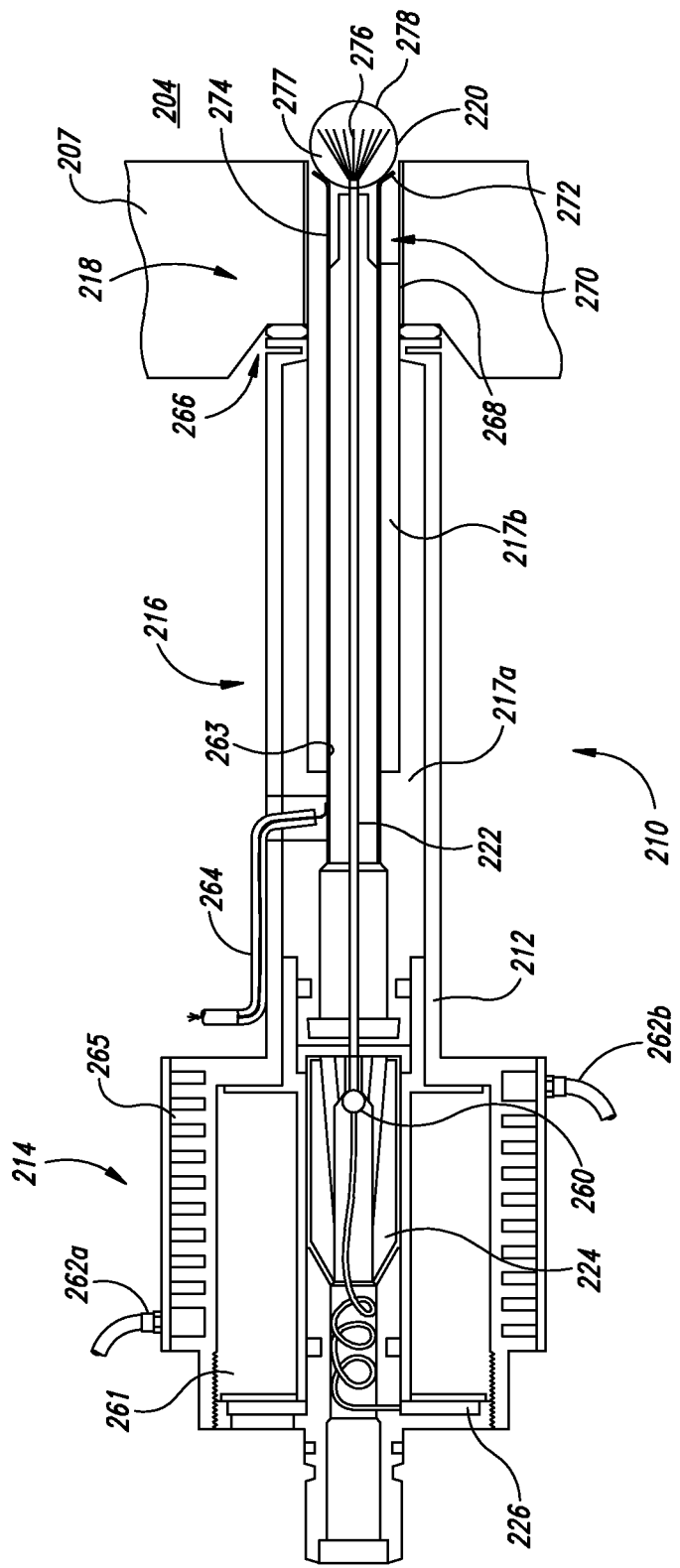
FIG. 2 is a cross-sectional side view of a suitable injector/igniter.

FIG. 2 is a cross-sectional side view of an example fuel injector 210 for use with an ignition system. The fuel injector 210 includes several features that are generally similar in structure and function to the corresponding features of the injector 110 described above with reference to FIG. 1. For example, the injector 210 includes a body 212 having a middle portion 216 extending between a base portion 214 and a nozzle portion 218. The nozzle portion 218 at least partially extends through an engine head 207 to position the end of the nozzle portion 218 at an interface with a combustion chamber 204. The body 212 includes a channel 263 extending through a portion thereof to allow fuel to flow through the injector 210. Other components can also pass through the channel 263. For example, the injector 210 further includes an actuator such as an assembly including 224, 260 and 222 that is operatively coupled to a controller or processor 226. The actuator rod or cable component 222 is also coupled to a valve or clamp member 260. The actuator 222 extends through the channel 263 from a driver 224 in the base portion 214 to a flow valve 220 in the nozzle portion 218. In certain embodiments, the actuator 222 can be a cable or rod assembly including, for example, fiber optics, electrical signal fibers, and/or acoustic communication fibers along with wireless transducer nodes. The actuator 222 is configured to cause the flow valve 220 to rapidly introduce multiple fuel bursts into the combustion chamber 204. The actuator 222 can also detect and/or transmit combustion properties to the controller 226.

According to one feature of the illustrated embodiment, the actuator 222 retains the flow valve 220 in a closed position seated against a corresponding valve seat 272. The base portion 214 includes two or more force generators 261, or drivers (shown schematically). The force generators 261 may be an electromagnetic force generator, a piezoelectric force generator, a combination of an electromagnetic and piezoelectric force generator, or other suitable types of force generators including pneumatic and hydraulic types and corresponding combinations and permutations. The force generators 261 are configured to produce driving forces that move the drivers 224. The drivers 224 contact the clamp member 260 to move the clamp member 260 along with the actuator 222. For example, the force generator 261 can produce a force that acts on the drivers 224 to pull the clamp member 260 and tension the actuator 222. The tensioned actuator 222 retains the flow valve 220 in the valve seat 272 in the closed position. When the force generator 261 does not produce a force that acts on the driver 224, the actuator 222 is relaxed thereby allowing the flow valve 220 to introduce fuel into the combustion chamber 204.

In the relaxed position, the force generators 261 may produce a second force that causes the actuator 222 to move the flow valve 220, such as by modulating the flow valve's movements at high frequencies. Thus, a first force generator may impart a force to open the valve, and a second force generator may impart forces to vibrate the valve open and closed or modulate the actuator when the valve is open.

The nozzle portion within 218 may include components that facilitate the actuation and positioning of the flow valve 220. For example, the flow valve 220 can be made from a first ferromagnetic material or otherwise incorporate a first ferromagnetic material (e.g., via plating a portion of the flow valve 220). The nozzle portion within 218 such as 270 or 272 can carry a corresponding second ferromagnetic material that is attracted to the first ferromagnetic material. For example, the valve seat 272 can incorporate the second ferromagnetic material. In this manner, these attractive components can help center the flow valve 220 in the valve seat 272, as well as facilitate the rapid actuation of the flow valve 220. In some cases, the actuator 222 passes through one or more centerline bearings (as further shown in Figures associated with concurrently filed application Fuel Injector Actuator Assemblies and Associated Methods of Use and Manufacture incorporated in its entirety by reference) to at least partially center the flow valve 220 in the valve seat 272.

Providing energy to actuate these attractive components of the injector 210 (e.g., the magnetic components associated with the flow valve 220) may expedite the closing of the flow valve 220, as well as provide increased closing forces acting on the flow valve 220. Such a configuration can enable extremely rapid opening and closing cycle times of the flow valve 220, among other benefits. The application of voltage for initial spark or plasma formation may ionize fuel passing near the surface of the valve seat 272, which may also ionize a fuel and air mixture adjacent to the combustion chamber 204 to further expedite complete ignition and combustion.

The base portion 214 also includes heat transfer features 265, such as heat transfer fins (e.g., helical fins). The base portion 214 also includes a first fitting 262a for introducing a suitable coolant including substances chosen for closed loop circulation to a heat rejection device such as a radiator, and substances such as fuel or another reactant that is consumed by the operation of the engine in which such coolants can flow around the heat transfer features 265, as well as a second fitting 262b to allow the coolant to exit the base portion 214. Such cooling of the fuel injector can at least partially prevent condensation and/or ice from forming when cold fuels are used, such as fuels that rapidly cool upon expansion. When hot fuels are used, however, such heat exchange may be utilized to locally reduce or maintain the vapor pressure of fuel contained in the passageway to the combustion chamber and prevent dribbling at undesirable times, among other benefits.

In some embodiments, the flow valve 220 may carry instrumentation 276 for monitoring combustion chamber events. For example, the flow valve 220 may be a ball valve made from a generally transparent material, such as quartz or sapphire. The ball valve 220 can carry the instrumentation 276 (e.g., sensors, transducers, and so on) inside the ball valve 220. In some cases, a cavity is formed in the ball valve 220 by cutting the ball valve 220 in a plane generally parallel with the face of the engine head 207. In this manner, the ball valve 220 can be separated into a base portion 277 as well as a lens portion 278. A cavity, such as a conical cavity, can be formed in the base portion 277 to receive the instrumentation 276. The lens portion 278 can then be reattached (e.g., adhered) to the base portion 277 to retain the generally spherical shape of the ball valve 220 or be modified as desired to provide another type of lens. In this manner, the ball valve 220 positions the instrumentation 276 adjacent to the combustion chamber 204 interface. Accordingly, the instrumentation 276 can measure and communicate combustion data including, for example, pressure data, temperature data, motion data, and other data.

In some cases, the flow valve 220 includes a treated face that protects the instrumentation 276. For example, a face of the flow valve 220 may be protected by depositing a relatively inert substance, such as diamond like plating, sapphire, optically transparent hexagonal boron nitride, BN—AlN composite, aluminum oxynitride (AlON including $Al_{23}O_{27}N_5$ spinel), magnesium aliminate spinel, and/or other suitable protective materials.

The body 212 includes conductive plating 274 extending from the middle portion 216 to the nozzle portion 218. The conductive plating 274 is coupled to an electrical conductor or cable 264. The cable 264 can also be coupled to a power generator, such as a suitable piezoelectric, inductive, capacitive or high voltage circuit, for delivering energy to the injector 210. The conductive plating 274 is configured to deliver the energy to the nozzle portion 218. For example, the conductive plating 274 at the valve seat 272 can act as a first electrode that generates an ignition event (e.g., spark or plasma) with corresponding conductive portions of the engine head 207.

In one embodiment, the nozzle portion 218 includes an exterior sleeve 268 comprised of material that is resistant to spark erosion. The sleeve 268 can also resist spark deposited material that is transferred to or from conductor 274, 272 or the conductive plating 274 (e.g., the electrode zones of the nozzle portion 218). The nozzle portion 218 may include a reinforced heat dam or protective portion 266 that is configured to at least partially protect the injector 210 from heat and other degrading combustion chamber factors. The protective portion 266 can also include one or more transducers or sensors for measuring or monitoring combustion parameters, such as temperature, thermal and mechanical shock, and/or pressure events in the combustion chamber 204.

The middle portion 216 and the nozzle portion 218 include a dielectric insulator, including a first insulator 217a at least partially surrounding a second insulator 217b. The second insulator 217b extends from the middle portion 216 to the nozzle portion 218. Accordingly, at least a segment of the second insulator 217b is positioned adjacent to the combustion chamber 204. In some cases, the second insulator 217b is of a greater dielectric strength than the first insulator 217a. In this manner, the second insulator 217b can be configured to withstand the harsh combustion conditions proximate to the combustion chamber 204. In some cases, the injector 210 includes an insulator made from a single material.

In some embodiments, at least a portion of the second insulator 217b in the nozzle portion 218 is spaced apart from the combustion chamber 204. This forms a gap or volume of air space 270 between the engine head 207 (e.g., the second electrode) and the conductive plating 274 (e.g., the first electrode) of the nozzle portion 218. The injector 210 can form plasma of ionized oxidant such as air in the space 270 before a fuel injection event. This plasma projection of ionized air can accelerate the combustion of fuel that enters the plasma. Moreover, the plasma projection can affect the shape of the rapidly combusting fuel according to predetermined combustion chamber characteristics. Similarly, the injector 210 can also ionize components of the fuel, or ionize mixtures of fuel components and oxidant to produce high energy plasma, which can also affect or change the shape of the distribution pattern of the combusting fuel.

Thus, fuel injectors 110 and 210 include various components and devices, such as drivers, force generators, and so on, capable of imparting multiple driving forces on valves and other fuel dispensing devices in order to create and/or modify various fuel shapes or patterns. The fuel injectors 110 and 210 also include various components and devices, such as controllers, capable of measuring parameters and other data associated with combustion events within combustion chambers and modifying operations of fuel injectors and fuel igniters based on the conditions within ignition systems. Various suitable ignition environments will now be discussed.

Figure 3A:
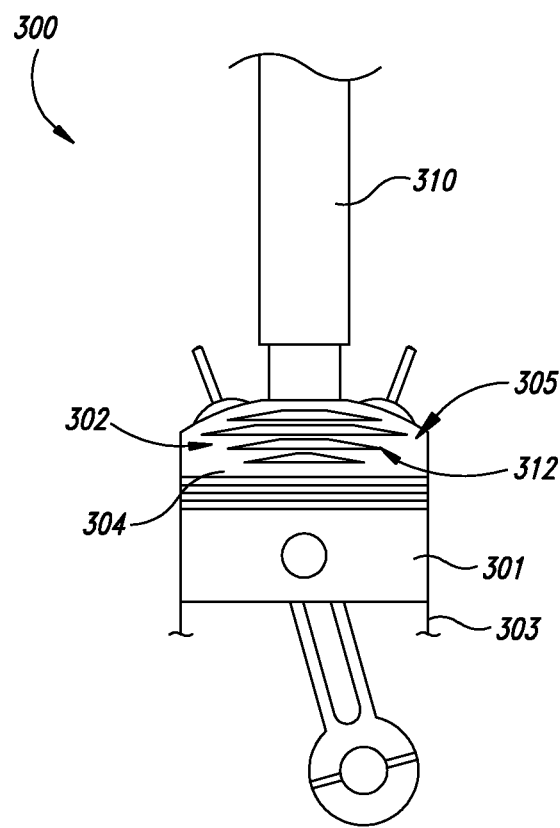
FIGS. 3A-3C are various side views of suitable ignition systems.

FIG. 3A is a side view illustrating a suitable ignition environment for an internal combustion system 300 having a fuel injector 310. A combustion chamber 302 is formed between a head portion containing the fuel injector 310 and valves, a movable piston 301 and the inner surface of a cylinder 303. Of course, other environments may implement the fuel injector 310, such as environments with other types of combustion chambers and/or energy transferring devices, including various vanes, axial and radial piston expanders, numerous types of rotary combustion engines, and so on.

The fuel injector 310 may include several features that not only allow the injection and ignition of different fuels within the combustion chamber 302, but also enable the injector 310 to adaptively inject and ignite these different fuels according to different combustion conditions or requirements. For example, the injector 310 may include one or more insulative materials configured to enable high-energy ignition of different fuel types, including unrefined fuels or low energy density fuels. The insulative materials may also withstand conditions required to combust different fuel types, including, for example, high voltage conditions, fatigue conditions, impact conditions, oxidation, erosion, and corrosion degradation.

The injector 310 may include instrumentation for sensing various properties of the combustion in the combustion chamber 302 (e.g., properties of the combustion process, the combustion chamber 302, the engine 304, and so on). In response to these sensed conditions, the injector 310 can adaptively optimize the fuel injection and ignition characteristics to achieve increased fuel efficiency and power production, as well as decrease noise, engine knock, heat losses and/or vibration to extend the engine and/or vehicle life, among other benefits.

The injector 310 may include actuating components to inject the fuel into the combustion chamber 302 to achieve specific flow or spray patterns 305, as well as the phase, of the injected fuel. For example, the injector 310 may include one or more valves positioned proximate to the interface of the combustion chamber 302. The actuating components, such as multiple drivers or force generators of the injector 310 provide for precise, high frequency operation of the valve to control at least the following features: the timing of fuel injection initiation and completion, the frequency and duration of repeated fuel injections, the shape of injected fuel, the timing and selection of ignition events, and so on.

Figure 3B:
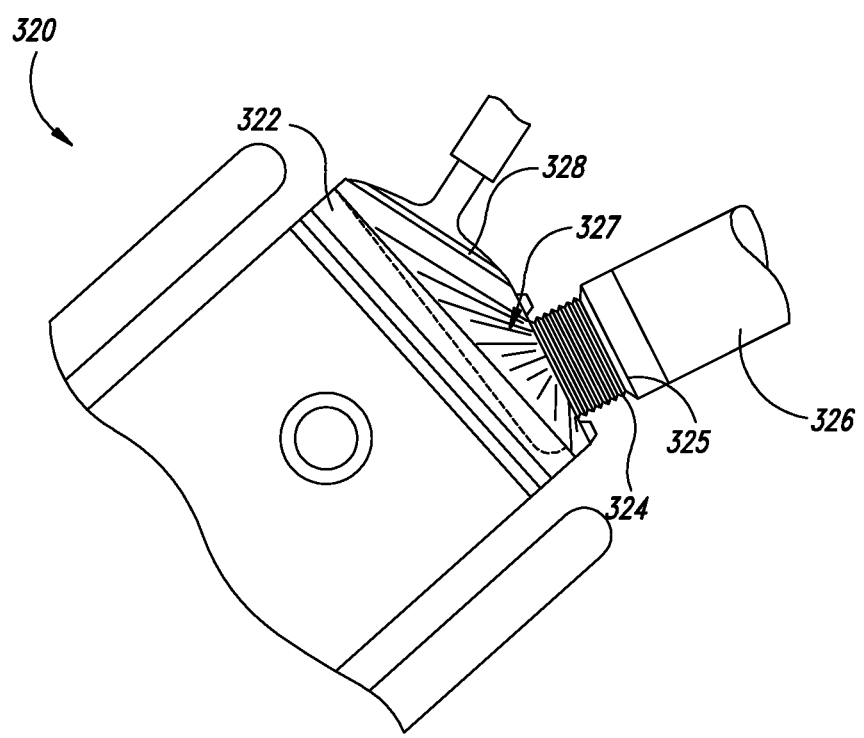

FIG. 3B shows partial views of characteristic engine block and head components and of injector 328 that operates as disclosed regarding embodiments with an appropriate fuel valve operator located in the upper insulated portion and that is electrically separated from the fuel flow control valve located very near the combustion chamber in which the stratified charge fuel injection pattern 326 is asymmetric as shown to accommodate the combustion chamber geometry shown. Such asymmetric fuel penetration patterns are preferably created by making appropriately larger fuel delivery passageways such as wider gaps in portions of slots shown in previous Figures to cause greater penetration of fuel entering the combustion chamber on appropriate fuel penetration rays of pattern 327 as shown to provide for optimized air utilization as a combustant and as an excess air insulator surrounding combustion to minimize heat losses to piston 324, components of the head including intake or exhaust valve 322, or the engine block including coolant in passages.

Figure 3C:
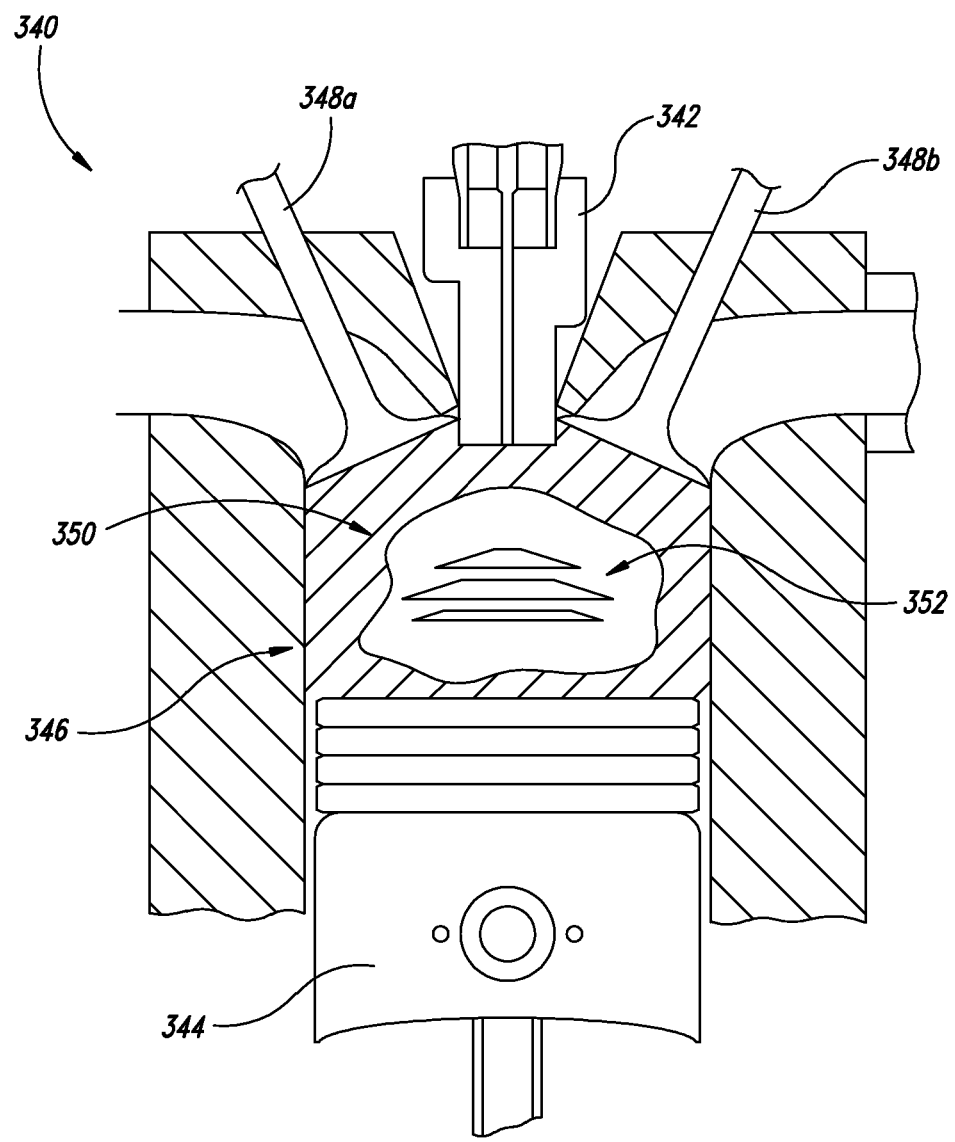
Figure 4A:
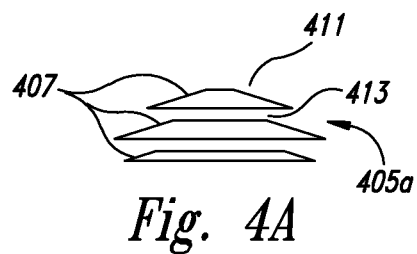
FIGS. 4A-4D illustrate layered burst patterns of fuel injected into a combustion chamber.
Figure 4B:
Figure 4C:
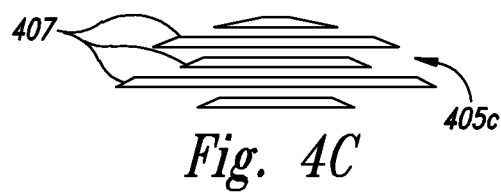
Figure 4D:
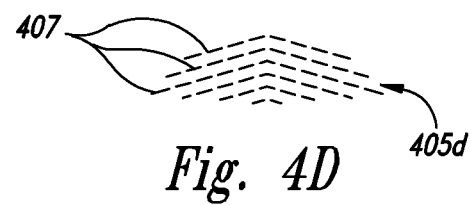

FIG. 3C is a schematic cross-sectional side view of a suitable ignition system 340. The ignition system 340 includes an integrated fuel injector/igniter 342 (e.g., an injector as described herein), a combustion chamber 346, one or more unthrottled air flow valves 348 (identified individually as a first valve 348a and a second valve 348b), and an energy transferring device, or piston 344. The injector 342 is configured to inject a layered or stratified charge of fuel 352 into the combustion chamber 346. The ignition system 340 is configured to inject and ignite the fuel 352 in an abundance or excess amount of an oxidant, such as air. The valves 348 enable admission of oxidant such as air at ambient pressure or even a positive pressure in the combustion chamber 346 prior to the combustion event. For example, the system 340 can operate without throttling or otherwise impeding air flow into the combustion chamber such that a vacuum is not created by restricting air entering the combustion chamber 346 prior to igniting the fuel 352. Due to the ambient or positive pressure in the combustion chamber 346, the excess oxidant forms an insulative barrier 350 adjacent to the surfaces of the combustion chamber (e.g., the cylinder walls, piston, engine head, and so on).

In operation, the fuel injector 342 injects the layered or stratified fuel 352 into the combustion chamber 346 in the presence of the excess oxidant. In some cases, the injection occurs when the piston 344 is at or past the top dead center position. In some cases, the fuel injector 342 injects the fuel 352 before the piston 344 reaches top dead center. Because the injector 342 is configured to adaptively inject the fuel including production of layered charges 352 as described herein, the fuel 352 is configured to rapidly ignite and completely combust in the presence of the insulative barrier 350 of the oxidant. As such, the insulative zone of surplus oxidant serves as a type of barrier 350 that substantially shields the walls of the combustion chamber 346 from heat given off from the fuel 352 when the fuel 352 ignites, thereby avoiding heat loss to the walls of the combustion chamber 346. As a result, the heat released by the rapid combustion of the fuel 352 is converted into work to drive the piston 344, rather than being transferred as a loss to the combustion chamber surfaces.

As discussed herein, fuel is injected in various burst patterns or shapes. FIGS. 4A-4D illustrate several fuel burst patterns 405 (identified individually as 405a-405d) of injected fuel. As those of ordinary skill in the art will appreciate, the illustrated patterns 405 are merely representative of various patterns and others are of course possible. Although the patterns 405 have different shapes and configurations, these patterns 405 share the feature of having sequential fuel layers 407. The individual layers 407 of the corresponding patterns 405 provide the benefit of relatively large surface to volume ratios of the injected fuel. The large surface to volume ratios provide higher combustion rates of the fuel charges, and assist in insulating and accelerating complete combustion of the fuel charges. Fast and complete combustion provides several advantages over slower burning fuel charges. For example, slower burning fuel charges require earlier ignition, cause significant heat losses to combustion chamber surfaces, and produce more backwork or output torque loss to overcome early pressure rise from the earlier ignition.

Multiple Driving Forces

As discussed herein, systems, devices, and processes described herein optimize various combustion requirements for different fuel types. They include fuel injector/igniters having multiple actuators or drivers (e.g., piezoelectric, magnetic, hydraulic, and so on) that act together to inject certain fuel spray patterns or otherwise modulate the introduction of fuel into a combustion chamber of a combustion engine.

Figure 5:
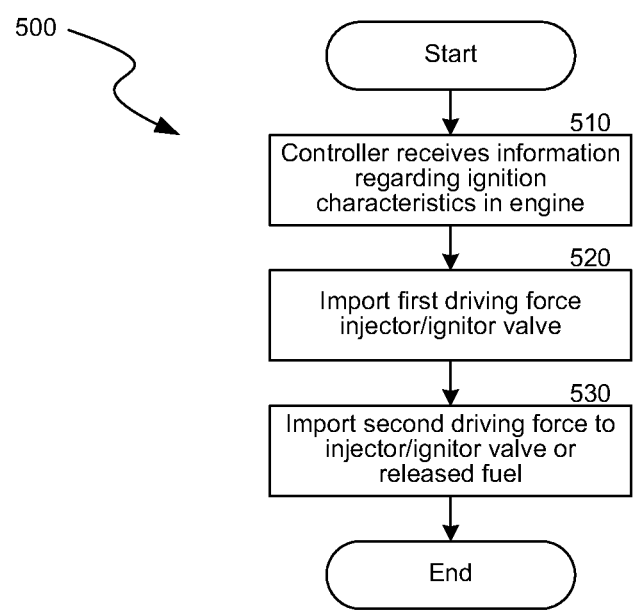
FIG. 5 is a flow diagram illustrating a routine for injecting fuel into a combustion chamber.

FIG. 5 is a flow diagram illustrating a routine 500 for injecting fuel into a combustion chamber. In step 510, a controller, associated with fuel injector, receives feedback regarding ignition conditions in a combustion engine, such as conditions associated with a combustion chamber. The controller may employ a number of different sensors to measure and receive information and data, such as sensors integrated into a fuel injector. The sensors may measure data associated with various parameters of ignition and combustion events within the combustion chamber, including pressure, temperature, fuel penetration into the oxidant inventory, subsequent fuel distribution patterns, motion of fuel distribution pattern, data associated with the ionization of an air-fuel mixture during a combustion of the mixture, rate of combustion of the mixtures produced, the ratio of fuel to air in a combusted mixture, penetration of the products of combustion into excess oxidant, patterns of the products of combustion, motion of the products of combustion and so on.

In step 520, the controller causes an actuator of the fuel injector to impart a first driving force to a valve or other fuel-dispensing device of the fuel injector. For example, the controller may provide instructions including adjustment of the fuel injection pressure, adjustment of the beginning timing of each fuel injection, adjustment of the timing that each fuel injection event ends, adjustment of the time between each fuel injection event, and adjustments to a driver or force generator to impart certain driving forces that cause the fuel control valve at the combustion chamber interface such as 120 or 200 or various other configurations of copending applications (filed concurrently on Jul. 21, 2010 and incorporated by reference in the disclosure above) to open and close at certain frequencies in order to inject fuel into the combustion chamber with a desired shape or pattern, such as those shown in FIGS. 4A-4D.

In step 530, the controller causes the actuator to impart a second driving force to the valve or other fuel-dispensing device of the fuel injector. In some cases, the controller causes an actuator within the fuel injector to impart the second driving force to vibrate the valve between open and closed positions or to further modify the shape or pattern of fuel during injection of the fuel. For example, the controller may modulate movement of the valve at high frequencies when the valve is open and allowing fuel to flow from the fuel injector and into the combustion chamber. The high frequency modulation generates fuel or charge shapes having various surface area to volume ratios. In some cases, the controller performs the modulation based on the information received in step 510, in order to provide suitable and effective fuel shapes with respect to conditions within a combustion chamber.

Fuel injectors capable of performing routine 500 may employ a variety of different drivers. In cases of high piston speeds, the first driver may be a piezoelectric valve driver and the second driver may be a piezoelectric driver. In some cases, any drivers capable of imparting a resonant vibration to an actuator cable may act as a second driver. For example, a solenoid may apply pulses using a pulse width modulation to an actuator cable in order to achieve modulation (similar to plucking a violin string). The pulse width modulation may be adaptively adjusted to produce the desired shape and surface to volume ratios of the multiple fuel injections. In other examples, the denser layer(s) and less dense layer(s) of fuel may be generated by various multiples of the resonant vibration of the valve or the control cable. In cases of large chambers, the first driver may be a hydraulic or pneumatic valve driver and the second driver may utilize solenoids, piezoelectric drivers, hydraulic drivers, pneumatic drivers, and the like.

In some cases, plasma within the combustion chamber or within cavities of the fuel injector may impart a second force on an injected fuel shape. The plasma work performance depends upon the voltage and current applied to suddenly heat, expand, thrust and propel the fuel, fuel-air mixture, or air before and/or after each fuel injection. Thus, the plasma generated during an ignition event may modify the fuel shape. Permanent or electromagnetic acceleration of the electric current produced during an ignition event may assist the plasma in modifying the fuel shape.

Illustratively, plasma generation in an oxidant such as air before each fuel injection creates thrust of ionized oxidant into the remaining oxidant within the combustion chamber. The inventory of ionized oxidant greatly accelerates ignition and completion of combustion of fuel that subsequently enters the combustion chamber. The pattern of ionized oxidant projecting into the combustion chamber helps impart the flow of remaining oxidant into fuel that follows the path of ionized air. Plasma generation within fuel entering the combustion chamber may be increased to provide sufficient electrical energy to accelerate the fuel for the purpose of overtaking the flow of ionized oxidant. In other modes plasma may be generated in fuel that is subsequently injected to produce additional groups of vectors that penetrate the oxidant within the combustion chamber. An example of such plasma thrusting of directed rays or vectors 327 regarding plasma projected fuel are shown in FIG. 3B. This provides optimal utilization of the oxidant in the combustion chamber in instances that an asymmetric location is provided for fuel injector 326 as shown.

Plasma shaping and characterization of fuel injection and oxidation events include:
1) Plasma ionization of oxidant prior to the arrival of fuel;
2) Plasma ionization of oxidant prior to the arrival of fuel followed by continued ionization of injected fuel;
3) Plasma ionization of fuel that is injected into oxidant within the combustion chamber;
4) Plasma ionization of at least a layer of oxidant adjacent to a layer of fuel;
5) Plasma ionization of a layer of oxidant adjacent to a layer of fuel adjacent to a layer of oxidant;
6) Plasma ionization of a mixture of fuel and oxidant;
7) Plasma ionization of oxidant after any of the above described events;
8) Plasma production of ion currents that are electromagnetically thrust into the combustion chamber; and
9) Plasma production of ion currents that are electromagnetically thrust and magnetically accelerated to desired vectors within the combustion chamber.

Plasma thrusting of oxidant, mixtures of oxidant and fuel, or fuel ions is provided by the electromagnetic forces that are generated by high current discharges. The general approach of such plasma generation is disclosed in exemplary references such as U.S. Pat. Nos. 4,122,816; 4,774,914 and 5,076,223, herein incorporated in their entirety by reference, and may utilize various high voltage generation systems including the type disclosed in U.S. Pat. No. 4,677,960, herein incorporated in its entirety by reference. Shaping of the plasma that may be generated in oxidant, fuel, and/or mixtures of oxidant and fuel may be accomplished by an electromagnetic lens such as utilized to selectively aim streams of electrons in a cathode ray tube or as disclosed in U.S. Pat. No. 4,760,820, herein incorporated in its entirety by reference, regarding streams of ions. Generally it is undesirable to incur the engine efficiency penalty and loss of selectivity of the type of ion generation desired and adaptive ion distribution shaping capabilities that the present invention achieves by reliance upon a high-pressure fuel delivery system (such as a high-pressure fuel delivery system disclosed in U.S. Pat. No. 5,377,633, herein incorporated in its entirety by reference).

In operation, plasma generation in an oxidant, such as excess air, before each fuel injection event, selectively creates a thrust of ionized oxidant into the remaining oxidant within the combustion chamber. The inventory of ionized oxidant greatly accelerates ignition and completion of combustion of fuel that subsequently enters the combustion chamber.

The pattern of ionized oxidant projecting into the combustion chamber is controlled by the voltage and current applied to the plasma that is formed and helps impart the flow of remaining oxidant into fuel that follows the path of ionized air. Plasma generation within fuel entering the combustion chamber may be increased to provide sufficient electrical energy to electromagnetically accelerate the fuel for the purpose of overtaking the flow of ionized oxidant.

In other modes of operation plasma generation may be modulated by control of the voltage and amperage delivered in injected fuel to provide greater velocity and penetration of fuel-rich layers or bursts into an oxidant within the combustion chamber.

Another embodiment of the disclosure provides for interchangeable utilization of fuel selections including mixtures of fuels such as diesel fuel; melted paraffin; gasoline; casing head or "drip" gasoline; methane; ethane; propane; butane; fuel alcohols; wet fuels such as 160-proof mixtures of water and one or more alcohols such as methanol, ethanol, butanol, or isopropanol; producer gas; and hydrogen. This is enabled by adaptive adjustment to provide sufficient plasma in each fuel injection delivery to suddenly produce fuel alterations including fuel evaporation/vaporization and chemical cracking to subdivide large molecules into smaller components including ionized species. Thus a wide variety of fuel selections, particularly very low cost fuels, are acceptable including fuels with contaminants such as water and cetane ratings that are far outside of acceptable "diesel fuel" specifications. Furthermore the plasma may be generated by electrode nozzles that produce sufficient plasma thrust of such ionized fuel species to penetrate desired distances into oxidant within the combustion chamber to allow relatively low fuel delivery pressures compared to typical diesel fuel pressurization requirements for achieving similar oxidant utilization. This overcomes the disadvantages and limitations of cetane-characterized fuel selection, "diesel delay," knock and relatively uncontrolled peak combustion temperatures that characterize conventional compression-ignition systems.

Such plasma induced fuel preparation and thrust generation to develop desired shapes and surface-to-volume characterizations of stratified fuel deliveries enables efficient utilization of harvested energy. An illustrative embodiment provides for regenerative braking of a vehicle, elevator or similar event to produce electrical energy and/or conversion of combustion chamber sourced radiation, pressure, thermal or vibration energy whereby such harvested electricity is utilized to produce the desired plasma. This overcomes the substantial loss of engine efficiency due to the pressure-volume work required to compress an oxidant sufficiently to heat it 370° C. (700° F.) or more including losses of such work-generated heat through the intentionally cooled walls of the combustion chamber along with the substantial work required to pump and pressurize diesel fuel to high pressures such as 1360 bar (20,000 PSI).

Figure 6A:
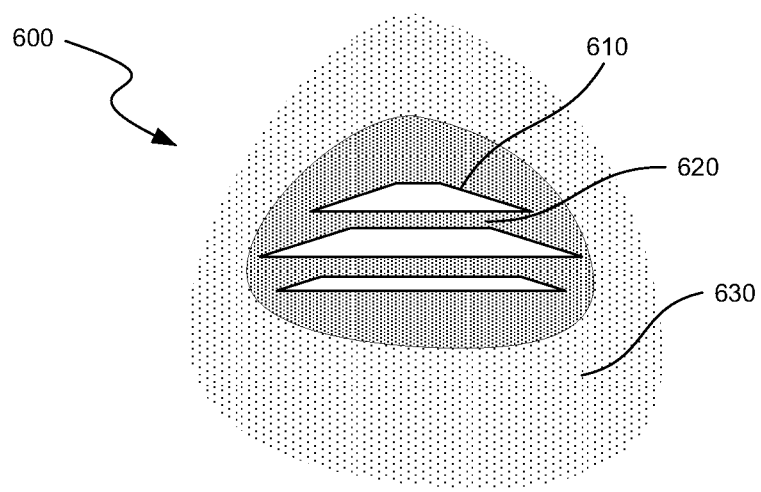
FIGS. 6A-6B illustrate layered burst patterns of fuel injected into a combustion chamber.
Figure 6B:
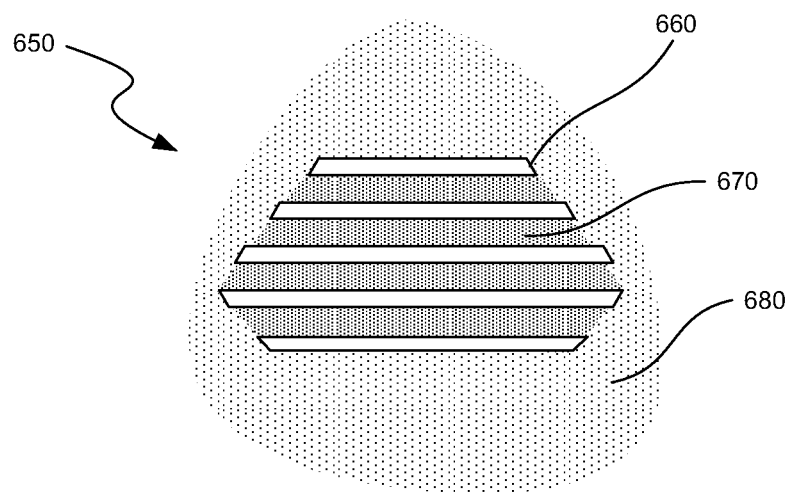

According to further aspects of the disclosure and as described herein, using multiple driving forces (e.g., the opening of the valve and modulation of the movement of the valve) provides for a variety of different fuel shapes. FIGS. 6A-6B illustrate layered burst patterns of fuel injected into a combustion chamber based on multiple forces. The fuel shapes 600, 650 may be dependent on the injection nozzle geometry, fuel delivery pressure gradients, fuel viscosities, compression ratios, oxidant temperatures, and so on. The shapes may include regions of fuel dense air-fuel mixtures 610, 660 separated by air dense air-fuel mixtures 620, 670, surrounded by surplus air 630, 680.

That is, imparting a second driving force (e.g., modulating an injection nozzle or valve, impacting a fuel pattern with a plasma, and so on) causes the fuel injector to generate different fuel patterns (FIGS. 6A-6B) than the fuel patterns (FIGS. 4A-4D) generated by simply opening a valve to inject a fuel into a combustion chamber. The shapes and patterns of FIG. 6A-6B may be established by transparent fuel in transparent oxidant but thought of as fog-like in density, with fuel-dense regions layered with air-dense regions within the fog. For example, the fog-like regions containing denser fuel rich fuel-air regions may be interspersed with less dense fuel rich regions, air rich regions, and/or air fuel regions to provide desirable surface area to volume ratios of the air-fuel mixture, enabling faster ignition times and complete ignition of the mixture, among other benefits.

Controlling the Ionization of a Air-fuel Mixture During an Ignition Event

As discussed herein, in some embodiments a controller modifies operation of a fuel injector or fuel igniter based on certain measured and/or detected conditions within a combustion chamber and associated with an ignition or combustion event of an injected fuel and air mixture. In some cases, the measured condition is associated with the ionization of the air-fuel mixture during the ignition event. Modifying operations based on monitoring and/or determining the ionization of an air-fuel mixture enables a fuel injection system to reduce or eliminate spark erosion of electrodes within the combustion chamber, among other benefits.

For example, the controller may reverse the polarity of a voltage applied to electrodes (that is, switch between using one electrode as a cathode and an anode) within a combustion chamber at high frequencies. The frequent reversal of polarity enables an ignition system to create many ions within an air-fuel mixture by greatly reducing or preventing net transfer of ions from one electrode to another and causing erosion to the electrodes, among other benefits, as such ions are rotated between the reversing polarity and/or thrust into the combustion chamber.

Figure 7:
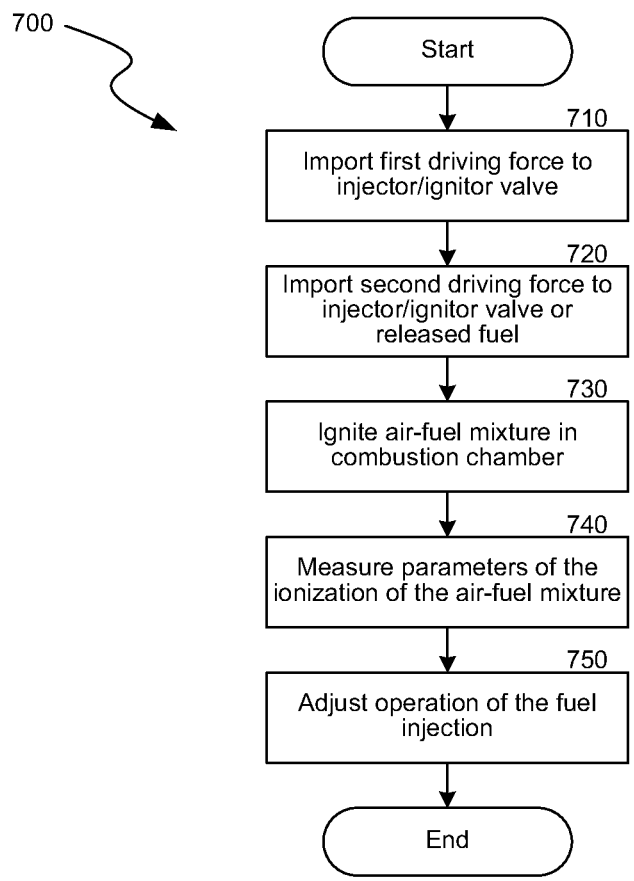
FIG. 7 is a flow diagram illustrating a routine for controlling the ionization of an air-fuel mixture during ignition within a combustion chamber.

FIG. 7 is a flow diagram illustrating a routine 700 for controlling the ionization of an air-fuel mixture during ignition within a combustion chamber. In step 710, a controller imparts a first driving force on a valve of a fuel injector. For example, the system causes a valve to open and dispense fuel into a combustion chamber.

In step 720, a controller imparts a second driving force on the valve of the fuel injector or on an injected fuel or air-fuel mixture. For example, the controller modulates the movement of the valve when the valve is in the open position, causing the valve to generate modified fuel shapes having certain surface area to volume ratios.

In step 730, a fuel igniter ignites an air-fuel mixture within the combustion chamber by applying a voltage to electrodes within the chamber. For example, the system generates a spark between a first electrode located on the fuel injector and a second electrode located within the combustion chamber at the engine head. During ignition, oxidant and/or fuel molecules are ionized and the ionized fuel molecules and surrounding air (i.e., a plasma) are ignited to produce energy.

In step 740, various sensors measure parameters of the ionization of an air-fuel mixture between the two electrodes in the combustion. Examples of measured parameters include the degree of ionization, the space potential, the magnetization of the ions, the size of the ionized area, the lifetime of the ionization, the density of ions, the temperature of the ionized area, electrical characteristics of the ionized area, and other parameters, such as those discussed herein. Of course, other parameters may be measured, including trends associated with certain parameters. For example, the sensors may provide information indicating a trend of increasing temperature during ignition events, indicating ignition events are increasingly ionized.

In step 750, the controller adjusts the operation of the fuel injection based on the measured parameters. For example the controller may adjust the polarity of a voltage applied to the electrodes, may raise or lower the frequency of polarity reversal between electrodes (that is, the frequency of changing the first electrode from a cathode to an anode).

In engines that it is desired to utilize a portion of the head such as the bore within 207 as an electrode without the protection of liner 268, spark erosion of the bore can be avoided by reversing polarity. Such reversal of polarity may be at very high rates including megahertz frequencies to avoid spark erosion.

Figure 8:
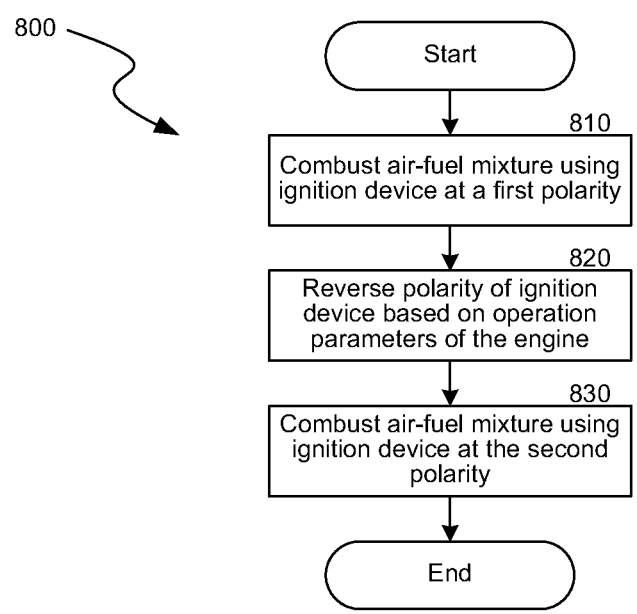
FIG. 8 is a flow diagram illustrating a routine for operating a fuel ignition device in a combustion engine.

As discussed herein, the inventors have identified conditions under which operating an ignition system may degrade or otherwise erode components within the ignition system, such as electrodes used to ignite air-fuel mixtures in a combustion chamber. FIG. 8 is a flow diagram illustrating a routine 800 for operating a fuel ignition device in a combustion engine.

In another illustrative embodiment during a first engine cycle, an ignition system, in step 810, combusts an air-fuel mixture using an ignition device at a first polarity. That is, the ignition system applies a voltage at a first polarity across two electrodes, such as a first electrode on a fuel injector and a second electrode in a combustion chamber, two electrodes of a spark plug, and so on.

In step 820, the ignition system reverses the polarity of the ignition device based on operating parameters of the ignition system, such as predetermined parameters, measured parameters, and so on. For example, the ignition system may reverse the polarity every engine cycle (e.g., for a four stroke engine at 6000 RPM, the systems reverse the polarity every other crank rotation or at 50 Hz). As another example, the ignition system may reverse the polarity upon detecting certain parameters, such as parameters that may lead to undesirable erosion of the electrodes.

After reversing the polarity, the ignition system, in step 830, combusts the air-fuel mixture using the ignition device at the second polarity. That is, the ignition system applies a voltage at a polarity reversed from the first polarity across the two electrodes. Thus, the "cathode" in a previous cycle acts as the "anode" in a subsequent cycle, and vice versa.

Conclusion

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. An injector, comprising:
a body having a base portion, a nozzle portion and a channel, wherein the channel is configured to deliver fuel from the base portion to the nozzle portion;
an actuator extending through the channel, the actuator having a distal end and a proximal end;
a flow valve positioned at the distal end of the actuator;
a driver operably connected to the proximal end of the actuator;
a first force generator positioned adjacent the driver and configured to impart a force to the driver to move the actuator toward the base portion to close the flow valve; and
a second force generator positioned adjacent the driver and configured to modulate movement of the flow valve when the flow valve is open.

2. The injector of claim 1, further comprising a clamp member attached to the proximal end of the actuator, and wherein the driver is configured to impart the force to the clamp member to close the flow valve and to modulate movement of the flow valve.

3. The injector of claim 1 wherein the first force generator and the second force generator are electromagnetic devices positioned to generate magnetic fields to move the driver.

4. The injector of claim 1 wherein the nozzle portion includes a valve seat, wherein the valve seat and the flow valve include ferromagnetic materials, and wherein the flow valve is magnetically attracted to the valve seat.

5. The injector of claim 1, further comprising:
a sensor positioned to measure parameters associated with a fuel ignition event within a fuel combustion chamber; and
a controller operably connected to the force generators and configured to provide operating instructions to the driver based on data received from the sensor and associated with the measured parameters.

6. The injector of claim 1, further comprising a controller operably connected to the force generators and configured to provide operating instructions to the force generators, wherein the controller provides operating instructions to the second force generator to vibrate the flow valve between an open position and a closed position.

7. The injector of claim 1, further comprising:
a valve seat at the nozzle portion, wherein the valve seat is positioned to receive the flow valve to stop a flow of fuel;
an electrical conductor attached to the body;
a conductive portion extending from the electrical conductor to the valve seat and configured to deliver electrical energy from the conductor to the nozzle portion;
a middle portion positioned between the base portion and the nozzle portion; and
an insulator extending from the middle portion to the nozzle portion, wherein at least a portion of the insulator is spaced apart from the valve seat to create a gap, and wherein the gap is configured to facilitate the generation of a plasma upon delivery of the electrical energy to the nozzle portion.

8. A method for injecting fuel into a combustion chamber of an engine, comprising:
- determining at least one parameter associated with a combustion event;
- transmitting instructions to a force generator to impart a force to a driver to modulate the movement of a valve when the valve is in the open position to influence the fuel dispensed into the combustion chamber; and
- discharging electrical energy into a gap to produce a plasma of ionized air.

9. The method of claim 8 wherein determining at least one parameter includes determining a degree of ionization of an air-fuel mixture during an ignition of the air-fuel mixture within the combustion chamber.

10. The method of claim 8 wherein determining at least one parameter includes determining a ratio of air to fuel within an air-fuel mixture.

11. The method of claim 8 wherein determining at least one parameter includes determining a rate of combustion of an air-fuel mixture during an ignition event within the combustion chamber.

12. The method of claim 8, further comprising adaptively adjusting the modulation of the movement of the valve in response to the measured parameter.

13. The method of claim 8 wherein imparting a force with the force generator includes imparting an electromagnetic force to modulate the movement of the valve.

14. A method for injecting fuel into a combustion chamber of an engine, comprising:
- determining at least one parameter associated with a combustion event; and
- transmitting instructions to a force generator to impart a force to a driver to modulate the movement of the valve when the valve is in the open position to influence the fuel dispensed into the combustion chamber, wherein adjusting the modulation of the movement of the valve includes adjusting the modulation to produce a stratified charge fuel injection pattern.

15. An injector-igniter configured to inject fuel into a combustion chamber of a combustion engine and ignite a fuel air mixture, the injector-igniter comprising:
- a body having a base portion, a middle portion and a nozzle portion;
- a fuel channel extending from the base portion to the nozzle portion;
- a flow valve positioned at the nozzle portion and moveable between a closed position and an open position to admit fuel to the combustion chamber;
- an actuator operably coupled to the flow valve to adjust the position of the flow valve;
- a driver positioned to engage the actuator to adjust the position of the flow valve;
- a conductive portion extending from the middle portion to the nozzle portion and configured to deliver electrical energy to ignite the fuel air mixture;
- an insulator extending at least partially through the body to the nozzle portion, the insulator defining a gap at the nozzle portion, wherein the gap is configured to facilitate the generation of a plasma;
- a first fitting operably coupled to the base portion and configured to introduce a coolant into the body;
- a closed loop circulation path inside the body and configured to circulate the coolant to remove heat from the body; and
- a second fitting operably coupled to the base portion and configured to remove the coolant from the body.

16. The injector-igniter of claim 15 wherein the base portion includes a plurality of heat transfer fins configured to remove heat from the injector-igniter.

17. An injector-igniter configured to inject fuel into a combustion chamber of a combustion engine and ignite a fuel air mixture, the injector-igniter comprising:
- a body having a base portion, a middle portion and a nozzle portion;
- a fuel channel extending from the base portion to the nozzle portion;
- a flow valve positioned at the nozzle portion and moveable between a closed position and an open position to admit fuel to the combustion chamber;
- an actuator operably coupled to the flow valve to adjust the position of the flow valve;
- a driver positioned to engage the actuator to adjust the position of the flow valve;
- a conductive portion extending from the middle portion to the nozzle portion and configured to deliver electrical energy to ignite the fuel air mixture;
- an insulator extending at least partially through the body to the nozzle portion, the insulator defining a gap at the nozzle portion, wherein the gap is configured to facilitate the generation of a plasma;
- a sensor positioned at the nozzle portion to detect at least one parameter associated with conditions inside the combustion chamber; and
- a controller operably coupled to the sensor and to the driver, wherein the controller is configured to adjust operation of the driver based on a value of the parameter.

18. The injector igniter of claim 17 wherein the sensor is positioned inside the flow valve, and wherein the flow valve includes a lens positioned to receive signals related to the parameter.

19. An injector-igniter configured to inject fuel into a combustion chamber of a combustion engine and ignite a fuel air mixture, the injector-igniter comprising:
- a body having a base portion, a middle portion and a nozzle portion;
- a fuel channel extending from the base portion to the nozzle portion;
- a flow valve positioned at the nozzle portion and moveable between a closed position and an open position to admit fuel to the combustion chamber;
- an actuator operably coupled to the flow valve to adjust the position of the flow valve;
- a first driver positioned to engage the actuator to adjust the position of the flow valve;
- a conductive portion extending from the middle portion to the nozzle portion and configured to deliver electrical energy to ignite the fuel air mixture; and
- an insulator extending at least partially through the body to the nozzle portion, the insulator defining a gap at the nozzle portion, wherein the gap is configured to facilitate the generation of a plasma; and
- a second driver positioned to engage the actuator to adjust the position of the flow valve, wherein the first driver moves the flow valve between an open position and a closed position, and wherein the second driver modulates the movement of the flow valve to produce a stratified charge fuel injection pattern.

* * * * *